US011811430B2

(12) United States Patent
Yoshida et al.

(10) Patent No.: US 11,811,430 B2
(45) Date of Patent: *Nov. 7, 2023

(54) TRANSMISSION DEVICE, RECEIVING DEVICE, TRANSMISSION METHOD, AND RECEIVING METHOD

(71) Applicant: Panasonic Intellectual Property Corporation of America, Torrance, CA (US)

(72) Inventors: Tadashi Yoshida, Ishikawa (JP); Ayako Horiuchi, Kanagawa (JP); Takashi Iwai, Ishikawa (JP); Yoshihiko Ogawa, Kanagawa (JP); Akihiko Nishio, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,835

(22) Filed: Feb. 28, 2023

(65) Prior Publication Data

US 2023/0208481 A1 Jun. 29, 2023

Related U.S. Application Data

(63) Continuation of application No. 17/225,029, filed on Apr. 7, 2021, now Pat. No. 11,632,153, which is a (Continued)

(30) Foreign Application Priority Data

Mar. 19, 2012 (JP) .................................. 2012-061974
May 11, 2012 (JP) .................................. 2012-109499

(51) Int. Cl.
*H04B 7/0456* (2017.01)
*H04W 72/04* (2023.01)
(Continued)

(52) U.S. Cl.
CPC ........... *H04B 7/0456* (2013.01); *H04B 7/068* (2013.01); *H04B 7/0632* (2013.01);
(Continued)

(58) Field of Classification Search
CPC .... H04B 7/0456; H04B 7/0632; H04B 7/068; H04B 7/0689; H04B 7/0691;
(Continued)

(56) References Cited

U.S. PATENT DOCUMENTS 8,446,886 B2 5/2013 Hu et al.
8,750,257 B2 6/2014 Chung et al.
(Continued)

FOREIGN PATENT DOCUMENTS

JP 2013509042 A 3/2013
JP 2013517713 A 5/2013
(Continued)

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 101 pages.
(Continued)

*Primary Examiner* — Abdullahi Ahmed
(74) *Attorney, Agent, or Firm* — Seed IP Law Group LLP

(57) ABSTRACT

This invention is a transmission device capable of enhancing the reception characteristics of a terminal when employing transmit diversity using two antenna ports in an ePDCCH. In a base station (100) that transmits a reference signal to a terminal (200) using two antenna ports, a setting unit (102), on the basis of the reception quality of the terminal, sets as the aforementioned two antenna ports either a first antenna port pair for which DMRS (reference signals) do not undergo mutual code multiplexing, or a second antenna port (Continued)

pair for which the DMRS do undergo code multiplexing. A transmitter (109) transmits the DMRS from the two antenna ports set in the setting unit (102).

10 Claims, 19 Drawing Sheets

Related U.S. Application Data continuation of application No. 14/383,021, filed as application No. PCT/JP2013/001485 on Mar. 8, 2013, now Pat. No. 11,005,543.

(51) Int. Cl.
| | |
|---|---|
| *H04L 5/00* | (2006.01) |
| *H04B 7/08* | (2006.01) |
| *H04B 7/06* | (2006.01) |
| *H04J 13/00* | (2011.01) |

(52) U.S. Cl.
CPC ......... *H04B 7/0689* (2013.01); *H04B 7/0691* (2013.01); *H04B 7/0871* (2013.01); *H04B 7/0874* (2013.01); *H04J 13/00* (2013.01); *H04L 5/0023* (2013.01); *H04L 5/0051* (2013.01); *H04W 72/04* (2013.01)

(58) Field of Classification Search
CPC ..... H04B 7/0871; H04B 7/0874; H04J 13/00; H04L 5/0023; H04L 5/0051; H04W 72/04
See application file for complete search history.

(56) References Cited

U.S. PATENT DOCUMENTS

| | | | | |
|---|---|---|---|---|
| 11,005,543 | B2* | 5/2021 | Yoshida | H04B 7/0871 |
| 11,632,153 | B2* | 4/2023 | Yoshida | H04B 7/0691 |
| | | | | 370/329 |
| 2003/0002471 | A1 | 1/2003 | Crawford et al. | |
| 2009/0067403 | A1 | 3/2009 | Chan et al. | |
| 2009/0316807 | A1* | 12/2009 | Kim | H04L 1/0618 |
| | | | | 375/299 |
| 2011/0176517 | A1 | 7/2011 | Hu et al. | |
| 2011/0228731 | A1 | 9/2011 | Luo et al. | |
| 2011/0235730 | A1 | 9/2011 | Noh et al. | |
| 2011/0249767 | A1 | 10/2011 | Chen et al. | |
| 2012/0052899 | A1 | 3/2012 | Wang et al. | |
| 2012/0188988 | A1 | 7/2012 | Chung et al. | |
| 2012/0213113 | A1 | 8/2012 | Zhao et al. | |
| 2012/0275414 | A1 | 11/2012 | Hu et al. | |
| 2013/0039284 | A1* | 2/2013 | Marinier | H04L 5/001 |
| | | | | 370/329 |
| 2013/0044692 | A1 | 2/2013 | Nory et al. | |
| 2013/0064215 | A1 | 3/2013 | Gao et al. | |
| 2013/0083769 | A1* | 4/2013 | Qu | H04W 72/23 |
| | | | | 370/335 |
| 2013/0194931 | A1 | 8/2013 | Lee et al. | |
| 2013/0242949 | A1 | 9/2013 | Hu et al. | |
| 2013/0343340 | A1* | 12/2013 | Seo | H04W 72/04 |
| | | | | 370/330 |
| 2014/0016556 | A1* | 1/2014 | Shimezawa | H04L 5/0016 |
| | | | | 370/328 |
| 2014/0050159 | A1* | 2/2014 | Frenne | H04L 5/0053 |
| | | | | 370/329 |
| 2014/0301346 | A1 | 10/2014 | Seo et al. | |
| 2014/0355709 | A1 | 12/2014 | Liu et al. | |
| 2014/0362832 | A1 | 12/2014 | Rudolf et al. | |
| 2015/0036606 | A1 | 2/2015 | Ji et al. | |
| 2015/0085690 | A1* | 3/2015 | Yi | H04L 25/0204 |
| | | | | 370/252 |
| 2015/0365150 | A1 | 12/2015 | Kim et al. | |

FOREIGN PATENT DOCUMENTS

| | | |
|---|---|---|
| WO | 2011/046349 A2 | 4/2011 |
| WO | 2011/085509 A1 | 7/2011 |

OTHER PUBLICATIONS

3GPP TS 36.212 V10.4.0, "3rd Generation Partnership Project; Technical Specification Group Radio Access Network; Evolved Universal Terrestrial Radio Access (E-UTRA); Multiplexing and channel coding (Release 10)," Dec. 2011, 79 pages.
3GPP TS 36.216 V10.1.0, "3rd Generation Partnership Project; Technical Specification Group Radio Access Network; Evolved Universal Terrestrial Radio Access (E-UTRA); Physical layer for relaying operation (Release 10)," Dec. 2010, 15 pages.
Extended European Search Report dated Mar. 25, 2015, for corresponding EP Application No. 13764602.2-1852 / 2830234, 7 pages.
Huawei, "CSI-RS Pattern Design," R1-103101, Agenda Item: 6.3.2.1, 3GPP TSG RAN WG1 meeting #61, Montreal, Canada, May 10-14, 2010, 8 pages.
International Search Report dated Jun. 4, 2013, for corresponding International Application No. PCT/JP2013/001485, 3 pages.
NTT Docomo, "DM-RS for E-PDCCH with TxD," R1-120409, Agenda Item: 7.6.1, 3GPP TSG RAN WG1 Meeting #68, Dresden, Germany, Feb. 6-10, 2012, 4 pages.
Pantech, "DM RS resource configuration for E-PDCCH," R1-120327, Agenda Item: 7.6.1, 3GPP TSG RAN Working Group 1 Meeting #68, Dresden, Feb. 6-10, 2012, 5 pages.
Samsung, "Discussion on DL Traffic to Pilot Power Ratio with DMRS," R1-102188, 3GPP TSG RAN WG1 #60bis, Agenda Item: 6.3.1, Beijing, China, Apr. 12-16, 2010, 5 pages.
Samsung, "Further discussion on E-PDCCH structure," R1-120187, Agenda Item: 7.6.1, 3GPP TSG RAN WG1 #68, Dresden, Germany, Feb. 6-10, 2012, 6 pages.
Ericsson et al., "On Downlink control signalling enhancements," Tdoc R1-112292, Agenda Item: 6.6.2.2, 3GPP TSG-RAN WG1 #66, Athens, Greece, Aug. 22-26, 2011. (2 pages).
Huawei et al., "Draft LS reply on Primary Component Carrier and Semi Persistent Scheduling (R2-102654)," R1-103081, Work Item: LTE_CA-Core, 3GPP TSG-RAN WG1 Meeting #61, Montreal, Canada, May 10-14, 2010. (1 page).
Philips, "Supported DM-RS Configurations for DL MU-MIMO," Tdoc R1-100402, Agenda Item: 7.2.3.2, 3GPP TSG RAN WG1 Meeting #59bis, Valencia Spain, Jan. 17-22, 2010. (5 pages).
Sharp, "Configuration of UE-specific RS for ePDCCH," R1-120279, Agenda Item: 7.6.1, 3GPP TSG RAN WG1 Meeting #68, Dresden, Germany, Feb. 6-10, 2012. (7 pages).

* cited by examiner

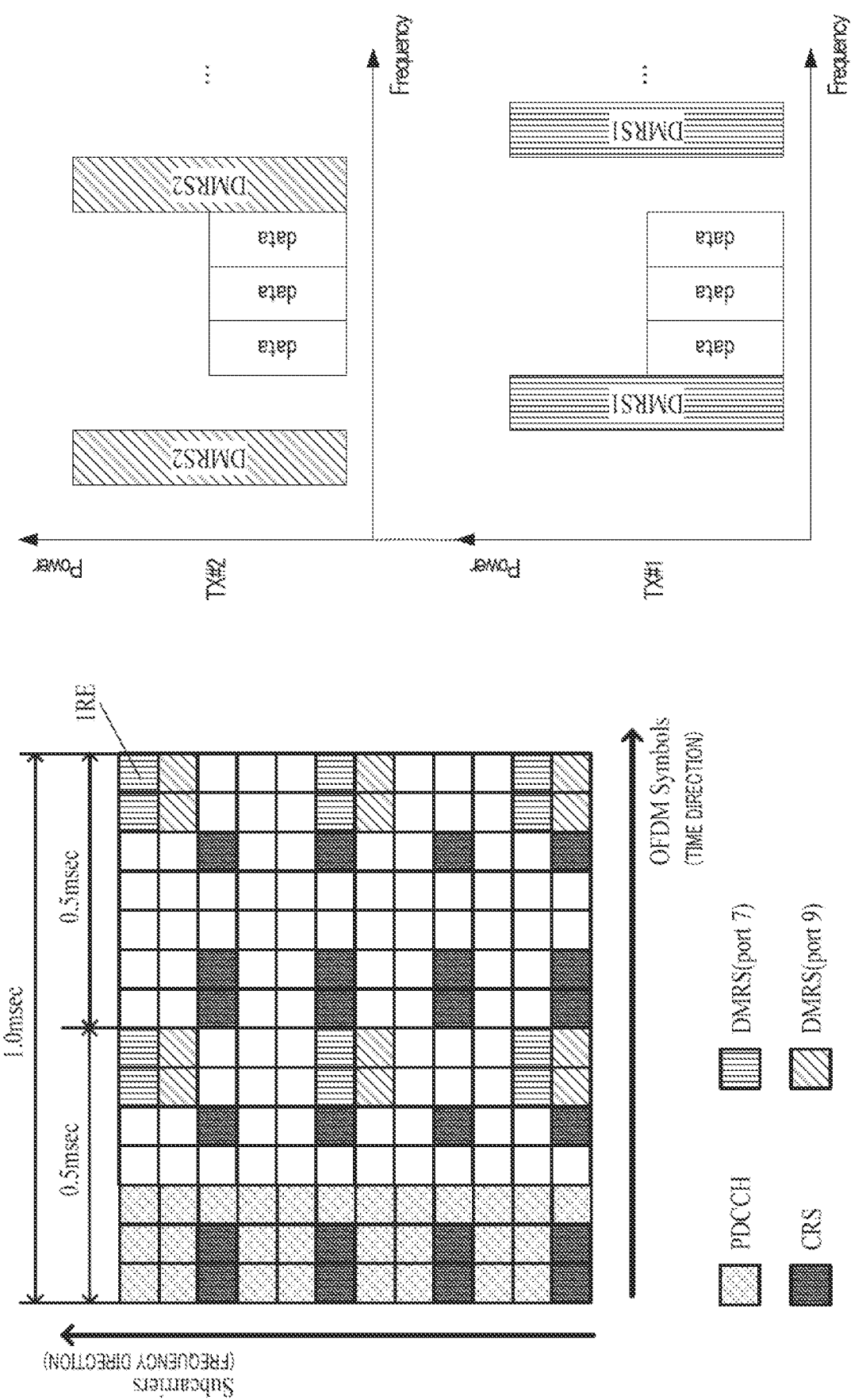

TRANSMISSION DEVICE, RECEIVING DEVICE, TRANSMISSION METHOD, AND RECEIVING METHOD

TECHNICAL FIELD

The present invention relates to a transmission apparatus, a reception apparatus, a transmission method and a reception method.

BACKGROUND ART

In recent years, accompanying the adoption of multimedia information in cellular mobile communication systems, it has become common to transmit not only speech data but also a large amount of data such as still image data and moving image data. Furthermore, studies have been actively conducted in LTE-Advanced (Long Term Evolution Advanced) to realize high transmission rates by utilizing broad radio bands, Multiple-Input Multiple-Output (MIMO) transmission technology, and interference control technology.

In addition, taking into consideration the introduction of various devices as radio communication terminals in M2M (machine to machine) communication and the like as well as an increase in the number of multiplexing target terminals due to MIMO transmission technology, there is a concern regarding a shortage of resources in a mapping region for PDCCH (Physical Downlink Control Channel) that is used for a control signal (that is, a "PDCCH region"). If a control signal (PDCCH) cannot be mapped due to such a resource shortage, data cannot be assigned to the terminals. Therefore, even if a resource region in which data is to be mapped is available, the resource region may not be used, which causes a decrease in the system throughput.

As a method for solving such a resource shortage, a study is being carried out on assigning, also in a data region (that is, "PDSCH (Physical Downlink Shared CHannel" region), control signals for radio communication terminal apparatuses (hereunder, abbreviated as "terminals," UE (User Equipment)) served by a radio communication base station apparatus (hereunder, abbreviated as "base station"). A resource region in which control signals for terminals served by the base station are mapped is referred to as an Enhanced PDCCH (ePDCCH) region, a New-PDCCH (N-PDCCH) region, an X-PDCCH region or the like. Mapping the control signal (i.e., ePDCCH) in a data region as described above enables transmission power control on control signals transmitted to a terminal near a cell edge or interference control for interference by a control signal to another cell or interference from another cell to the cell provided by the base station.

Further, according to the LTE-Advanced system, in order to expand the coverage area of each base station, relay technology has been studied in which a radio communication relay station apparatus (hereunder, abbreviated as "relay station") is installed between a base station and terminals, and communication between the base station and terminals is performed via the relay station. The use of relay technology allows a terminal that cannot communicate with the base station directly to communicate with the base station via the relay station. According to the relay technology that has been introduced in the LTE-Advanced system, control signals for relay are assigned in a data region. Since it is expected that the control signals for relay may be extended for use as control signals for terminals, a resource region in which control signals for relay are mapped is also referred to as an "R-PDCCH."

In the LTE (Long Term Evolution) system, a DL grant (also referred to as "DL assignment"), which indicates a downlink (DL) data assignment, and a UL grant, which indicates an uplink (UL) data assignment are transmitted through a PDCCH.

In LTE-Advanced, a DL grant and UL grant are mapped to R-PDCCH as well as PDCCH. In the R-PDCCH, the DL grant is mapped in the first slot and the UL grant is mapped in the second slot (refer to NPL 1). Thus, each relay station monitors (blind-decodes) control signals transmitted using an R-PDCCH from a base station within a resource region indicated by higher layer signaling from the base station (i.e., a "search space") and thereby finds the control signal intended for the corresponding relay station. In this case, the base station indicates the search space corresponding to the R-PDCCH to the relay station by higher layer signaling as described above.

As for the design of ePDCCH, part of the design of the above-described R-PDCCH may be used or a design completely different from the design of the R-PDCCH may be used. Studies are actually being carried out on making the design of ePDCCH different from the design of R-PDCCH. Studies are also being conducted with respect to individually configuring terminals with search spaces corresponding to ePDCCHs.

In the LTE and LTE-Advanced systems, each RB (resource block) has 12 subcarriers in the frequency domain and has a width of 0.5 msec in the time domain. A unit in which two RBs are combined in the time domain is referred to as an RB pair (for example, see FIG. 1). That is, as shown in FIG. 1, an RB pair has 12 subcarriers in the frequency domain, and has a width of 1 msec in the time domain. When an RB pair represents a group of 12 subcarriers on the frequency axis, the RB pair may be referred to as simply "RB." In addition, in a physical layer, an RB pair is also referred to as a PRB pair (physical RB pair). The term "resource element (RE)" refers to a resource unit defined by a single subcarrier and a single OFDM symbol (see FIG. 1).

As described above, a DL grant is mapped to the first slot and a UL grant is mapped to the second slot in an R-PDCCH region. That is, a resource to which the DL grant is mapped and a resource to which the UL grant is mapped are divided on the time axis. In contrast, for the ePDCCHs, studies are being conducted with regard to dividing resources to which DL grants are mapped and UL grants are mapped on the frequency axis (that is, subcarriers or PRB pairs), and with regard to dividing REs within an RB pair into a plurality of groups.

LTE-Advanced defines transmission methods such as transmission through single-antenna port precoding and transmission through precoding using multiple antenna ports (e.g., see NPLs 2 and 3).

In the following description, transmission through single-antenna port precoding may be called "single-antenna port transmission ("One Tx port")" and transmission through precoding using multiple antenna ports may be called "transmission diversity using multiple antenna ports ("Multi ports Tx diversity" or simply "Tx diversity")." In the following description, "precoding" represents assigning a weight to a transmission signal (multiplying a transmission signal by a weight) per antenna port or antenna. "Layer" represents each of spatially multiplexed signals and may also be called "stream." The term "rank" represents the number of layers. The term "transmission diversity" generically refers to transmission of data using a plurality of channels or a plurality of resources. By applying transmission diversity, signals are transmitted through channels (resources) including favorable channels (resources) and poor channels (resources), and it is thereby possible to obtain average reception quality. That is, according to transmission diversity, reception quality becomes stable without causing it to degrade considerably. For example, channels or resources used in transmission diversity are frequency, time, space, antenna ports and beams.

[Single-Antenna Port Transmission]

In single-antenna port transmission, a base station selects precoding (also referred to as "closed-loop precoding" or "feedback-based precoding") based on feedback information indicating channel quality measured by a terminal. For this reason, single-antenna port transmission is a transmission method which is effective when reliability of feedback information is high, for example, when the moving speed of a terminal is relatively low. However, when feedback information is not obtained or when the moving speed of the terminal is relatively high and reliability of the feedback information is low, the base station may select optional precoding (open-loop processing).

For example, single-antenna port transmission is applicable to antenna port 1 (CRS (Cell specific Reference Signal)), antenna port 4 (MBMS (Multimedia Broadcast Multicast Service)), antenna port 5 (UE specific RS), antenna port 7 (DMRS (Demodulation Reference Signal)) and antenna port 8 (DMRS).

[Transmission Diversity Using Multiple Antenna Ports]

Transmission diversity using multiple antenna ports can obtain a diversity gain without requiring feedback information. For this reason, transmission diversity using multiple antenna ports is a transmission method which is effective when the moving speed of the terminal is relatively high and a variation of channel quality is violent or when channel quality is poor and a diversity gain is necessary.

An example of transmission diversity using multiple antenna ports used at rank 2 or higher is large delay CDD (Cyclic Delay Diversity) (spatial multiplex+transmission diversity). On the other hand, transmission diversity using multiple antenna ports used at rank 1 is, for example, spatial frequency block coding for 2 antenna ports (SFBC: Space Frequency Block Code) and SFBC-FSTD (Frequency Switched Transmit Diversity) for 4 antenna ports.

For example, transmission diversity using multiple antenna ports is applied to antenna ports 1 and 2 (CRS) and antenna ports 1, 2, 3 and 4 (CRS). Note that transmission diversity using multiple antenna ports is supported in CRS, but not supported in DMRS.

CITATION LIST

Non-Patent Literature

NPL 1
3GPP TS 36.216 V10.1.0 "Physical layer for relaying operation"
NPL 2
3GPP TS 36.211 V10.4.0 "Physical Channels and Modulation"
NPL 3
3GPP TS 36.212 V10.4.0 "Multiplexing and channel coding"
NPL 4
NTT DOCOMO, 3GPP RAN WG1 Meeting #68, R1-120409, "DM-RS for E-PDCCH with TxD," February 2012

SUMMARY OF INVENTION

Technical Problem

The number of CRS antenna ports used for demodulation of PDCCH is determined for each cell and is common to terminals within the same cell. The transmission method varies depending on the number of CRS antenna ports. More specifically, when the number of antenna ports is 1, precoding with the number of antenna ports of 1 (that is, single-antenna port transmission) is applied, and when the number of antenna ports is 2 or 4, transmission diversity for 2 antenna ports or 4 antenna ports (that is, transmission diversity using multiple antenna ports) is applied.

When demodulating R-PDCCH, the base station indicates each terminal of which of CRS or DMRS is to be used by higher layer signaling, and can thereby change a reference signal used for demodulation of R-PDCCH for each terminal. However, reference signals used for demodulation of R-PDCCH cannot be dynamically changed in units of subframes. Therefore, in R-PDCCH, it is not possible to dynamically (in short period) switch between transmission diversity using CRS and single-antenna port transmission using DMRS.

In ePDCCH, studies are also being conducted on supporting both single-antenna port transmission and transmission diversity using multiple antenna ports. Moreover, in ePDCCH, studies are being conducted on supporting transmission diversity using multiple antenna ports using DMRS without using CRS.

When performing transmission diversity using multiple antenna ports in ePDCCH, use of antenna ports 7 and 9 shown in FIG. 1 as antenna ports to which DMRS is assigned is proposed (e.g., see NPL 4). In FIG. 1, DMRSs (DMRSs (ports 7 and 8)) assigned to antenna ports 7 and 8 are mapped to REs in the same time direction respectively and code-multiplexed, and DMRSs corresponding to two antenna ports are thereby accommodated. Likewise, in FIG. 1, DMRSs (DMRSs (ports 9 and 10)) assigned to antenna ports 9 and 10 are mapped to REs in the same time direction respectively and code-multiplexed, and DMRSs corresponding to two antenna ports are thereby accommodated. That is, in FIG. 1, DMRS assigned to antenna port 7 and DMRS assigned to antenna port 9 are mapped to different REs (different frequencies) and not code-multiplexed.

In the following description, a combination of antenna ports such as antenna ports 7 and 8 shown in FIG. 1 in which DMRSs assigned thereto are code-multiplexed may be called "code-multiplexed antenna port." On the other hand, a combination of antenna ports such as antenna ports 7 and 9 shown in FIG. 1 in which DMRSs assigned thereto are not code-multiplexed may be called "non-code-multiplexed antenna port."

Using antenna ports 7 and 9 shown in FIG. 1 as antenna ports to which DMRSs are assigned (hereinafter may be referred to as "DMRS antenna ports") allows power boosting to be applied to antenna ports 7 and 9 respectively. This makes it possible to improve channel estimation accuracy and improve reception characteristics.

However, when performing transmission diversity using two antenna ports in ePDCCH, assigning DMRSs to antenna ports 7 and 9 shown in FIG. 1 requires two times as many DMRS resources as those in a case where DMRSs are assigned to antenna ports 7 and 8 shown in FIG. 1. Thus, in the case where transmission diversity using two antenna ports is performed compared to the case where antenna ports 7 and 8 are used, it is not possible to reserve many resources to which ePDCCH is assigned (e.g., REs represented by white blocks shown in FIG. 1), resulting in a problem that the coding rate of ePDCCH (ratio of an amount of transmission information [bits] of ePDCCH to the total number of REs of ePDCCH) increases and reception characteristics of the terminal deteriorate.

An object of the present invention is to provide a transmission apparatus, a reception apparatus, a transmission method and a reception method capable of improving reception characteristics of a terminal in transmission diversity using two antenna ports on ePDCCH.

Solution to Problem

A transmission apparatus according to an aspect of the present invention is a transmission apparatus that transmits reference signals to a reception apparatus using two antenna ports, the transmission apparatus including: a configuration section that configures one of a first antenna port pair and a second antenna port pair as the two antenna ports based on reception quality of the reception apparatus, the first antenna port pair being an antenna port pair in which the reference signals are not mutually code-multiplexed, the second antenna port pair being an antenna port pair in which the reference signals are code-multiplexed; and a transmission section that transmits the reference signals from the two configured antenna ports.

A reception apparatus according to an aspect of the present invention includes: a reception section that receives reference signals transmitted using two antenna ports among a plurality of antenna ports included in a transmission apparatus; and a control signal processing section that identifies one of a first antenna port pair and a second antenna port pair as the two antenna ports based on reception quality of the reception apparatus and that demodulates a control signal using reference signals in the identified two antenna ports, the first antenna port pair being an antenna port pair in which the reference signals are not mutually code-multiplexed, the second antenna port pair being an antenna port pair in which the reference signals are code-multiplexed.

A transmission method according to an aspect of the present invention is a transmission method for transmitting reference signals to a reception apparatus using two antenna ports, the transmission method including: configuring one of a first antenna port pair and a second antenna port pair as the two antenna ports based on reception quality of the reception apparatus, the first antenna port pair being an antenna port pair in which the reference signals are not mutually code-multiplexed, the second antenna port pair being an antenna port pair in which the reference signals are code-multiplexed; and transmitting the reference signals from the two configured antenna ports.

A reception method according to an aspect of the present invention includes: receiving reference signals transmitted using two antenna ports among a plurality of antenna ports included in a transmission apparatus; and identifying one of a first antenna port pair and a second antenna port pair as the two antenna ports based on reception quality of the reception apparatus and demodulating a control signal using reference signals in the identified two antenna ports, the first antenna port pair being an antenna port pair in which the reference signals are not mutually code-multiplexed, the second antenna port pair being an antenna port pair in which the reference signals are code-multiplexed.

Advantageous Effects of Invention

According to the present invention, it is possible to improve reception characteristics of a terminal in transmission diversity using two antenna ports on ePDCCH.

BRIEF DESCRIPTION OF DRAWINGS

FIGS. 6A and 6B illustrate resource mapping and transmission power in a case using non-code-multiplexed antenna ports according to Embodiment 1 of the present invention;

DESCRIPTION OF EMBODIMENTS

Figure 1:
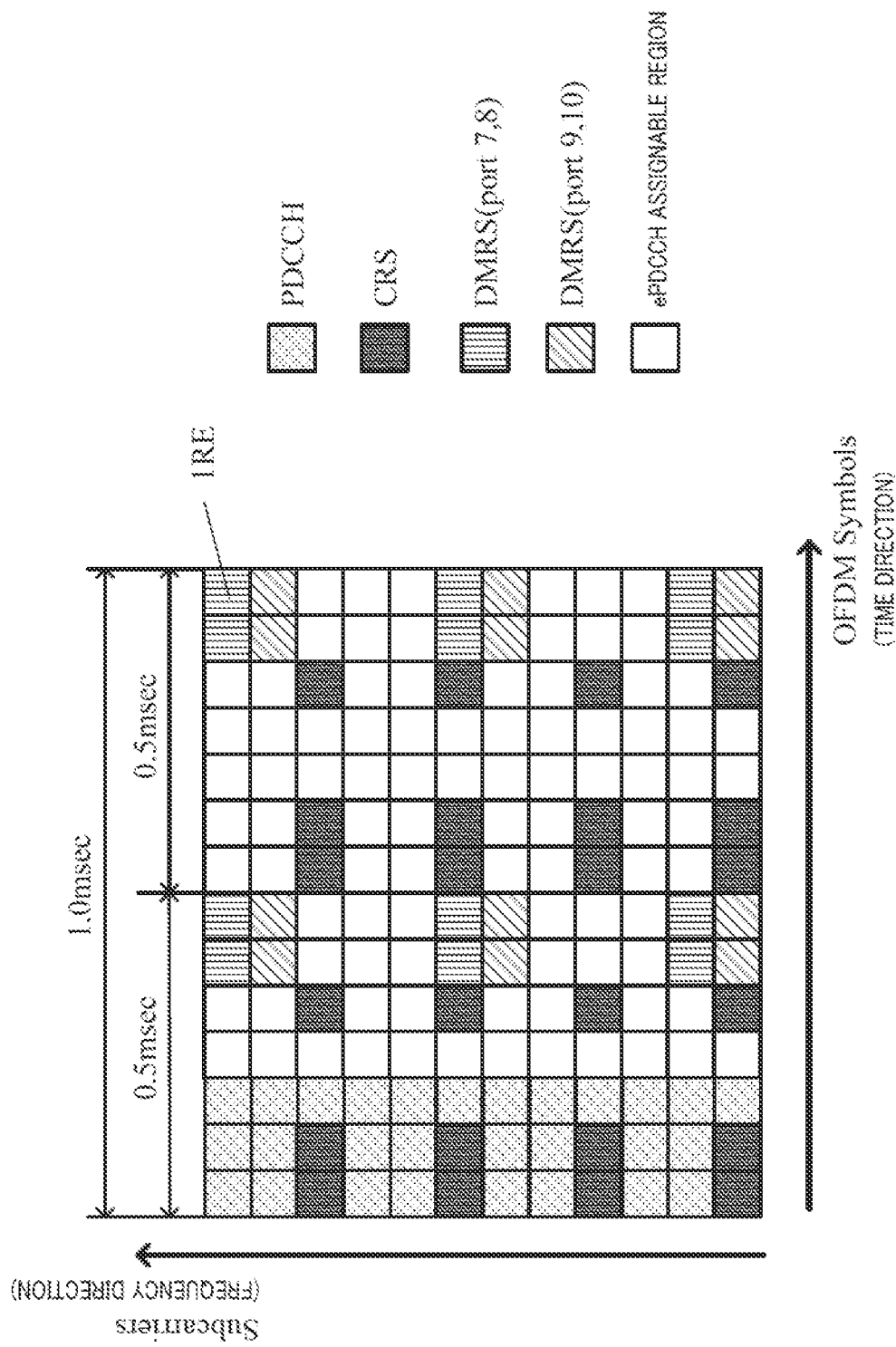
FIG. 1 is a diagram provided for describing PRB pairs.

Embodiments of the present invention will be described in detail hereunder with reference to the accompanying drawings. Throughout the embodiments, the same elements are assigned the same reference numerals, and any duplicate description of the elements is omitted.

Embodiment 1

[Communication System Overview]

A communication system according to the present embodiment includes a transmission apparatus and a reception apparatus. In particular, the present embodiment is described by taking base station 100 as the transmission apparatus and taking terminal 200 as the reception apparatus. The communication system is, for example, an LTE-Advanced system. Base station 100 is, for example, a base station that supports the LTE-Advanced system, and terminal 200 is, for example, a terminal that supports the LTE-Advanced system.

Figure 2:
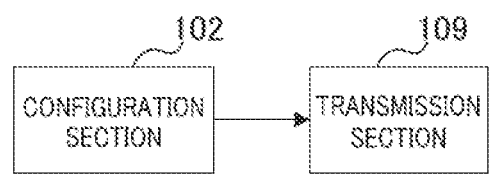
FIG. 2 is a block diagram illustrating a main configuration of a base station according to Embodiment 1 of the present invention.

FIG. 2 is a block diagram illustrating a main configuration of base station 100 according to the present embodiment.

Base station 100 transmits DMRS to terminal 200 using two antenna ports. Configuration section 102 configures one of a combination of antenna ports on which DMRSs are not mutually code-multiplexed (first antenna port pair) and a combination of antenna ports on which DMRSs are code-multiplexed (second antenna port pair) as the above-described two antenna ports based on reception quality of terminal 200. Transmission section 109 transmits DMRSs from the two antenna ports configured in configuration section 102.

Figure 3:
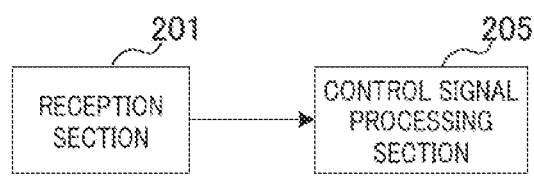
FIG. 3 is a block diagram illustrating a main configuration of a terminal according to Embodiment 1 of the present invention.

FIG. 3 is a block diagram illustrating a main configuration of terminal 200 according to the present embodiment.

In terminal 200, reception section 201 receives DMRSs transmitted using two antenna ports among multiple antenna ports of base station 100. Control signal processing section 205 identifies one of a combination of antenna ports at which DMRSs are not code-multiplexed (first antenna port pair) and a combination of antenna ports at which DMRSs are code-multiplexed (second antenna port pair) as the above-described two antenna ports based on reception quality of terminal 200, and demodulates control signals using the DMRSs at the two identified antenna ports.

[Configuration of Base Station 100]

Figure 4:
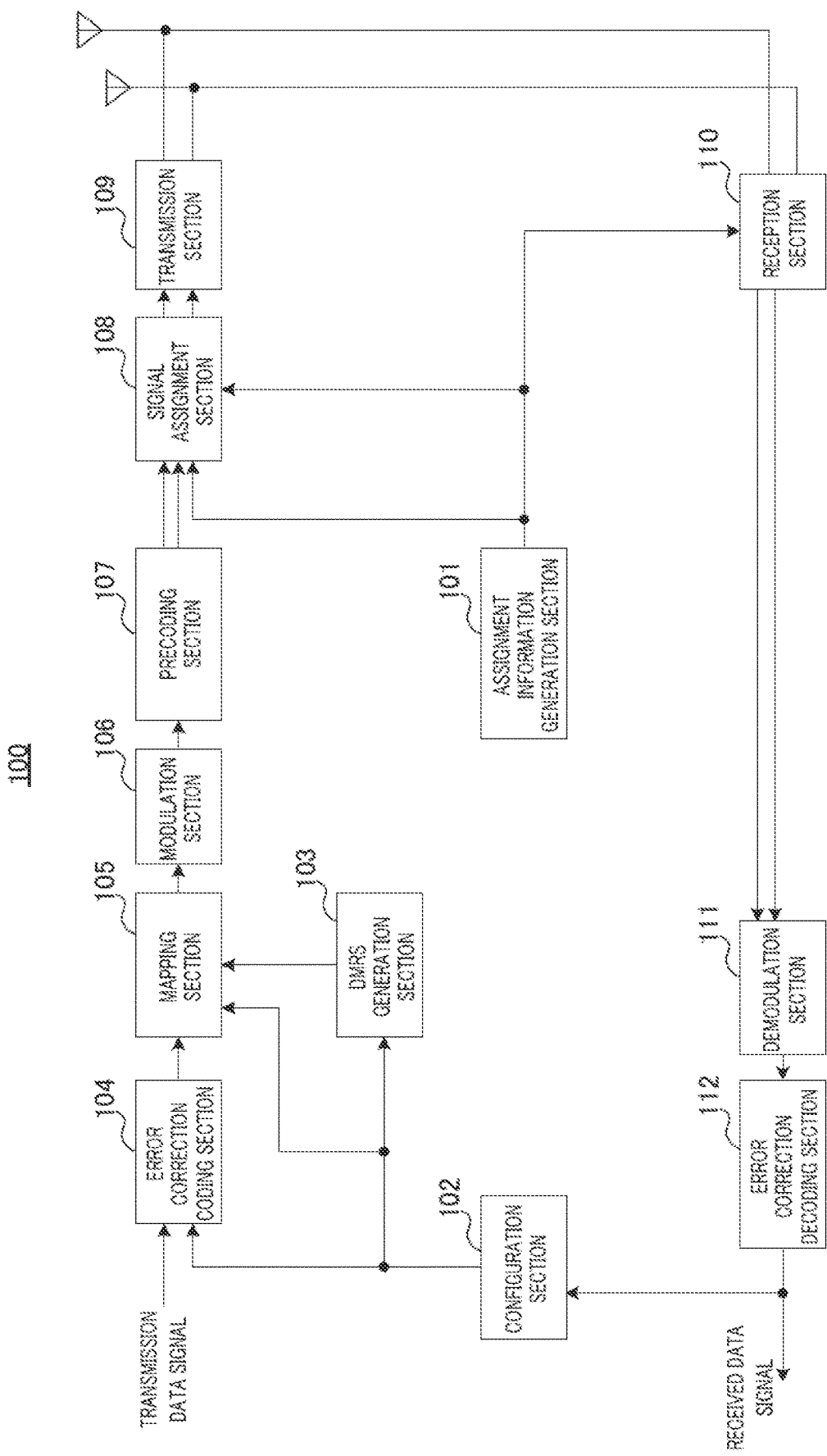
FIG. 4 is a block diagram illustrating a configuration of the base station according to Embodiment 1 of the present invention.

FIG. 4 is a block diagram illustrating a configuration of base station 100 according to the present embodiment. In FIG. 4, base station 100 includes assignment information generation section 101, configuration section 102, DMRS generation section 103, error correction coding section 104, mapping section 105, modulation section 106, precoding section 107, signal assignment section 108, transmission section 109, reception section 110, demodulation section 111, and error correction decoding section 112.

In a case where there is a downlink data signal (DL data signal) to be transmitted and an uplink data signal (UL data signal) to be assigned to an uplink (UL), assignment information generation section 101 determines resources (RB) to which the data signals are assigned, and generates assignment information (DL assignment and UL grant). The DL assignment includes information relating to assignment of the DL data signal. The UL grant includes information relating to allocated resources for the UL data signal to be transmitted from terminal 200. The assignment information is outputted to signal assignment section 108. The DL assignment is outputted to signal assignment section 108 as control information for assigning a DL data signal and the UL grant is outputted to reception section 110 as control information for receiving a UL data signal.

Configuration section 102 first generates reception quality information indicating reception quality of terminal 200 for each terminal 200 using information relating to the reception quality of terminal 200 inputted from error correction decoding section 112 and reported from terminal 200. For example, the information relating to the reception quality of terminal 200 is path loss, RSRP (Reference Signal Reception Power), measurement report including an ACK/NACK transmission frequency or the like and CQI (Channel Quality Indicator) value.

Next, configuration section 102 configures antenna ports (DMRS antenna ports) to which DMRSs are assigned in ePDCCH transmitted to configuration target terminal 200 based on the generated reception quality information. More specifically, configuration section 102 configures one of a combination of non-code-multiplexed DMRS ports (e.g., two antenna ports 7 and 9 shown in FIG. 1) and a combination of code-multiplexed DMRS ports (e.g., two antenna ports 7 and 8 shown in FIG. 1) as DMRS antenna ports based on reception quality of terminal 200 indicated by reception quality information. For example, when the reception quality of terminal 200 does not satisfy a predetermined reference (when the reception quality is poor), configuration section 102 configures the combination of non-code-multiplexed DMRS ports. On the other hand, when the reception quality of terminal 200 satisfies the predetermined reference (when the reception quality is favorable), configuration section 102 configures the combination of code-multiplexed DMRS ports. The information indicating the configured DMRS antenna ports (DMRS antenna port information) is outputted to DMRS generation section 103 and mapping section 105, and also outputted to error correction coding section 104 as a control signal. The DMRS antenna port information is indicated to terminal 200 via a higher layer (e.g., RRC (Radio Resource Control) signaling). Details of configuration processing on DMRS ports by configuration section 102 will be described later.

DMRS generation section 103 generates DMRS based on the DMRS port information inputted from configuration section 102 and outputs the generated DMRS to mapping section 105.

Error correction coding section 104 receives a transmission data signal (DL data signal) and a control signal from configuration section 102 as input, performs error correction coding on the inputted signal and outputs the coded signal to mapping section 105. For example, error correction coding section 104 performs error correction coding on the control information transmitted in ePDCCH using a coding rate calculated based on an aggregation level in ePDCCH and the DMRS port information inputted from configuration section 102.

Mapping section 105 maps the signal received from error correction coding section 104 and the DMRS received from DMRS generation section 103 to each resource based on the DMRS port information inputted from configuration section 102 and outputs the signal mapped to each resource to modulation section 106.

Modulation section 106 performs modulation processing on the signal received from mapping section 105 and outputs the modulated signal to precoding section 107.

Precoding section 107 performs precoding processing on a signal to be transmitted through ePDCCH or PDCCH for each antenna port. Precoding section 107 outputs the signal after the precoding processing to signal assignment section 108.

Signal assignment section 108 assigns the assignment information (DL assignment and UL grant) received from assignment information generation section 101 to ePDCCH or PDCCH. Signal assignment section 108 assigns the signal received from precoding section 107 to a downlink resource corresponding to the assignment information (DL assignment) received from assignment information generation section 101.

A transmission signal is formed by assigning the assignment information and the signal to a predetermined resource. The transmission signal formed is outputted to transmission section 109 for each antenna port.

Transmission section 109 applies radio transmission processing such as up-conversion to an input signal and transmits the signal to terminal 200 via each antenna port. In this way, a DMRS generated in DMRS generation section 103 is transmitted from a DMRS antenna port configured in configuration section 102.

Reception section 110 receives a signal transmitted from terminal 200 via an antenna and outputs the received signal to demodulation section 111. More specifically, reception section 110 separates a signal corresponding to a resource indicated by a UL grant received from assignment information generation section 101 from the received signal, applies reception processing such as down-conversion to the separated signal and outputs the signal to demodulation section 111.

Demodulation section 111 applies demodulation processing to the input signal and outputs the signal obtained to error correction decoding section 112.

Error correction decoding section 112 decodes the input signal and obtains a received data signal from terminal 200. Of the received data signal, information relating to the aforementioned reception quality of terminal 200 is outputted to configuration section 102.

[Configuration of Terminal 200]

Figure 5:
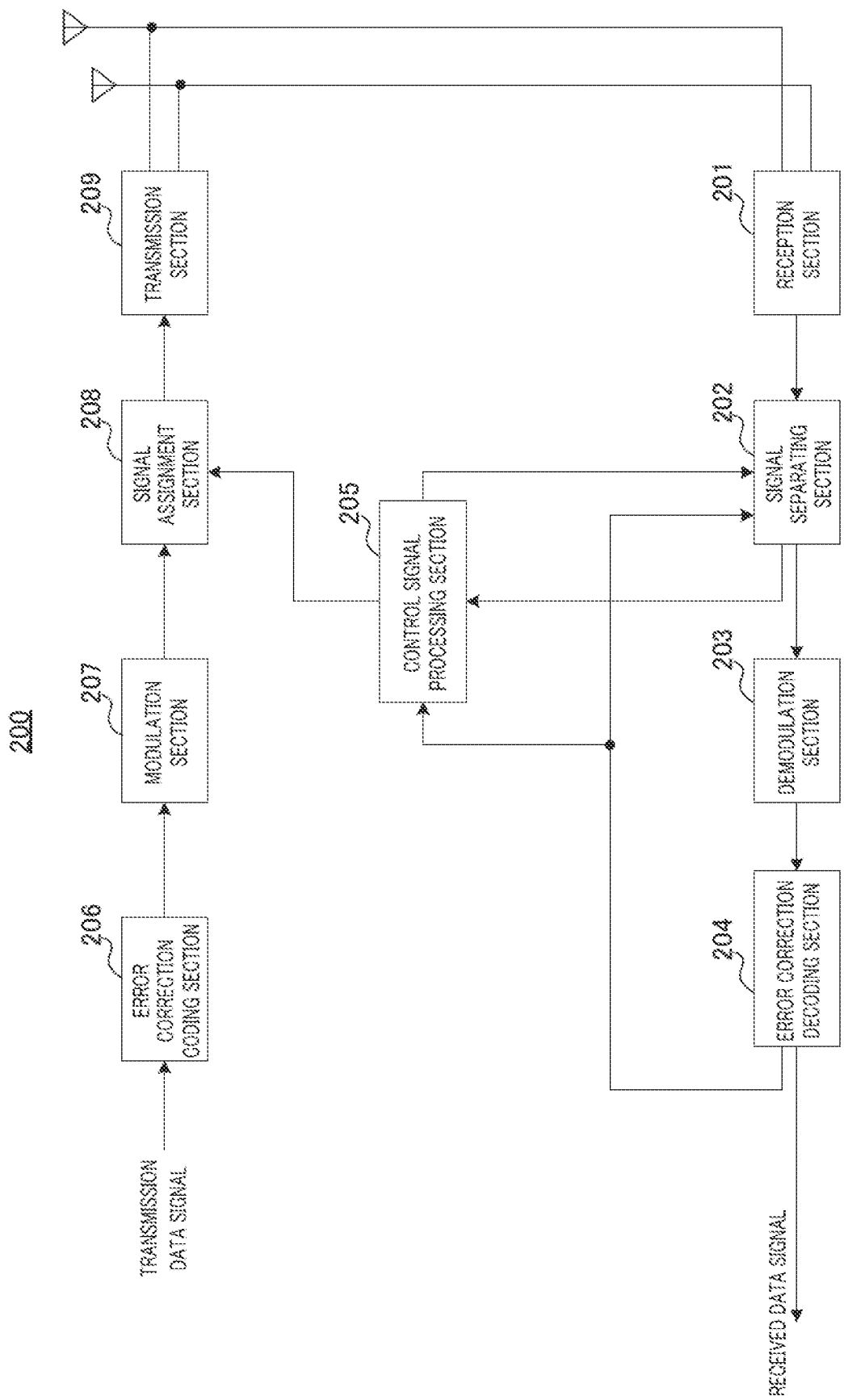
FIG. 5 is a block diagram illustrating a configuration of the terminal according to Embodiment 1 of the present invention.

FIG. 5 is a block diagram illustrating the configuration of terminal 200 according to the present embodiment. As illustrated in FIG. 5, terminal 200 includes reception section 201, signal separating section 202, demodulation section 203, error correction decoding section 204, control signal processing section 205, error correction coding section 206, modulation section 207, signal assignment section 208, and transmission section 209.

Reception section 201 receives a signal transmitted from base station 100 via an antenna, applies reception processing such as down-conversion and then outputs the signal to signal separating section 202. The received signal includes DMRS antenna port information indicating an antenna port assigned to DMRS in ePDCCH intended for terminal 200. The DMRS antenna port information is indicated by, for example, a higher layer. The received signal also includes DMRS transmitted via one of antenna ports of base station 100.

Signal separating section 202 extracts a control signal from the received signal inputted from reception section 201 with reference to assignment information of ePDCCH and the DMRS antenna port information inputted from error correction decoding section 204 and outputs the extracted control signal to control signal processing section 205. Signal separating section 202 also extracts a signal corresponding to a data resource indicated by DL assignment inputted from control signal processing section 205 (that is, DL data signal) from the received signal inputted from reception section 201 and outputs the extracted signal to demodulation section 203.

Demodulation section 203 demodulates the data signal outputted from signal separating section 202 and outputs the demodulated signal to error correction decoding section 204.

Error correction decoding section 204 decodes the signal outputted from demodulation section 203 and outputs the received data signal obtained. Error correction decoding section 204 outputs the assignment information of ePDCCH and the DMRS antenna port information indicated by a higher layer from base station 100 out of the received data signal to signal separating section 202 and control signal processing section 205.

Control signal processing section 205 performs blind decoding on each PDCCH or each ePDCCH which is a control signal received from signal separating section 202 using DMRS included in the received signal with reference to the assignment information of ePDCCH and the DMRS antenna port information inputted from error correction decoding section 204, and thereby detects a control signal (DL assignment or UL grant) intended for terminal 200. Control signal processing section 205 outputs the detected DL assignment intended for terminal 200 to signal separating section 202 and outputs the detected UL grant intended for terminal 200 to signal assignment section 208.

Error correction coding section 206 receives a transmission data signal (UL data signal) as input, performs error correction coding on the transmission data signal and outputs the transmission data to modulation section 207. Note that the transmission data signal includes the information relating to reception quality of terminal 200 such as the aforementioned measurement report and CQI value.

Modulation section 207 modulates the signal outputted from error correction coding section 206, and outputs the modulated signal to signal assignment section 208.

Signal assignment section 208 assigns the signal outputted from modulation section 207 according to the UL grant received from control signal processing section 205, and outputs the obtained signal to transmission section 209.

Transmission section 209 executes transmission processing such as up-conversion on the input signal, and transmits the obtained signal.

[Operations of Base Station 100 and Terminal 200]

The operation of base station 100 and terminal 200 each configured in the manner described above will be described.

First, as described above, a case will be described in detail where non-code-multiplexed antenna ports 7 and 9 are used as a combination of two antenna ports configured as DMRS antenna ports.

FIG. 6A illustrates resource mapping when DMRSs are assigned to non-code-multiplexed antenna ports 7 and 9. As shown in FIG. 6A, DMRSs (DMRS (port 7) and DMRS (port 9)) assigned to antenna ports 7 and 9 are mapped to different REs (different frequencies). That is, the combination of non-code-multiplexed antenna ports is a combination of antenna ports mapped to REs to which different DMRSs are assigned. Thus, as shown in FIG. 6B, power boosting is applicable to DMRSs mapped to different frequency resources. For example, in FIG. 6B, transmission power of DMRSs 1 and 2 assigned to antenna ports 7 and 9 (Tx #1 and Tx #2 in FIG. 6B) is set to be twice that of data signals. Thus, it is possible to improve channel estimation accuracy when DMRSs are assigned to non-code-multiplexed antenna ports 7 and 9.

However, as shown in FIG. 6A, DMRSs assigned to antenna port 7 are mapped to REs (12 REs per PRB pair) of antenna port 7 shown in FIG. 1. Similarly, DMRSs assigned to antenna port 9 are mapped to REs (12 REs per PRB pair) of antenna port 9 shown in FIG. 1. That is, in FIG. 6A, DMRSs are mapped to 24 REs per PRB pair, requiring twice as many resources as those in the case where DMRSs are assigned to antenna ports 7 and 8 (see FIG. 1). Thus, as shown in FIG. 6A, when DMRSs are assigned to non-code-multiplexed antenna ports 7 and 9, the resource amount for DMRSs (number of REs) relatively increases, and it is not possible to secure many resources (number of REs) for ePDCCH accordingly, and therefore the coding rate of ePDCCH indicated by a ratio of the amount of transmission information [bits] in ePDCCH to the total number of REs of ePDCCH increases, causing reception characteristics of terminal 200 to deteriorate.

In contrast, a case will be considered where code-multiplexed antenna ports 7 and 8 are used as a combination of two antenna ports configured as DMRS antenna ports.

Figures 7A, 7B:
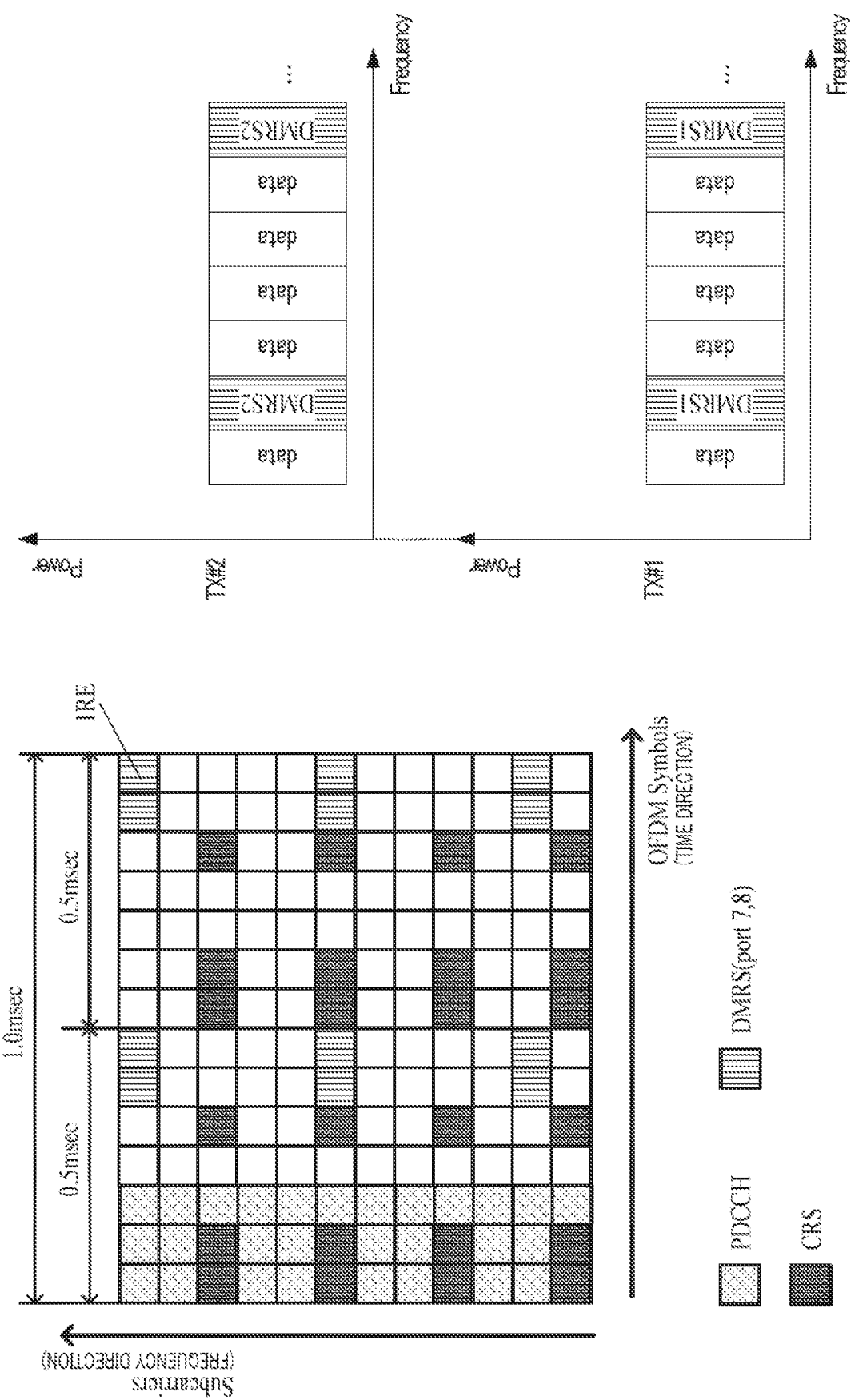
FIGS. 7A and 7B illustrate resource mapping and transmission power in a case using code-multiplexed antenna ports according to Embodiment 1 of the present invention.

FIG. 7A illustrates resource mapping when DMRSs are assigned to code-multiplexed antenna ports 7 and 8. As shown in FIG. 7A, since DMRSs (DMRS (port 7) and DMRS (port 8)) are assigned to code-multiplexed antenna ports 7 and 8, DMRSs are mapped to 12 REs per PRB pair in FIG. 7A. That is, as shown in FIG. 7A, by assigning DMRSs to code-multiplexed antenna ports 7 and 8, it is possible to reduce the resource amount for DMRS compared to a case where DMRSs are assigned to non-code-multiplexed antenna ports 7 and 9 (FIG. 6A) and reserve more resources for ePDCCH (number of REs) accordingly.

For example, in ePDCCH, dividing each PRB pair (e.g., see FIG. 1) into a plurality of resources is under study. Resources divided within an RB pair are called "CCEs (control channel elements)." Suppose the modulation scheme of ePDCCH is fixed to QPSK. Thus, in ePDCCH, the coding rate of ePDCCH differs depending on the number of REs assigned to each of DMRS and ePDCCH. As an example, the number of REs constituting one CCE in ePDCCH is assumed to be 32. In this case, when DMRSs are assigned to antenna ports 7 and 9 as in the case of FIG. 6A, if the number of REs used for DMRS in each CCE is assumed to be 4, REs to be used for ePDCCH in the CCE are the remaining 28 REs. On the other hand, when DMRSs are assigned to antenna ports 7 and 8 as in the case of FIG. 7A, if REs to be used for DMRS in each CCE are assumed to be 2 REs, REs to be used for ePDCCH in the CCE are the remaining 30 REs. That is, as shown in FIG. 7A, when DMRSs are assigned to antenna ports 7 and 8, the coding rate of ePDCCH is lower compared to FIG. 6A and it is possible to improve the coding gain, and thereby improve reception characteristics of terminal 200.

However, as shown in FIG. 7A, DMRSs assigned to antenna ports 7 and 8 (DMRS (port 7) and DMRS (port 8)) are mapped to the same RE (same frequency). That is, the combination of code-multiplexed antenna ports is a combination of antenna ports where assigned DMRSs are mapped to the same RE. For this reason, when the total transmission power of all antenna ports is assumed to be constant (e.g., twice the transmission power of a data signal per antenna port at maximum as in the case of FIG. 6B), power boosting is not applicable to DMRSs as shown in FIG. 7B. For this reason, when DMRSs are assigned to code-multiplexed antenna ports 7 and 8, channel estimation accuracy cannot be improved.

Thus, when FIG. 6A is compared with FIG. 7A, if DMRSs are assigned to non-code-multiplexed antenna ports 7 and 9 as shown in FIG. 6A, it is possible to improve channel estimation accuracy although it is difficult to obtain a coding gain. On the other hand, as shown in FIG. 7A, if DMRSs are assigned to code-multiplexed antenna ports 7 and 8, although it is not possible to improve channel estimation accuracy, it is possible to improve the coding gain.

Figure 8:
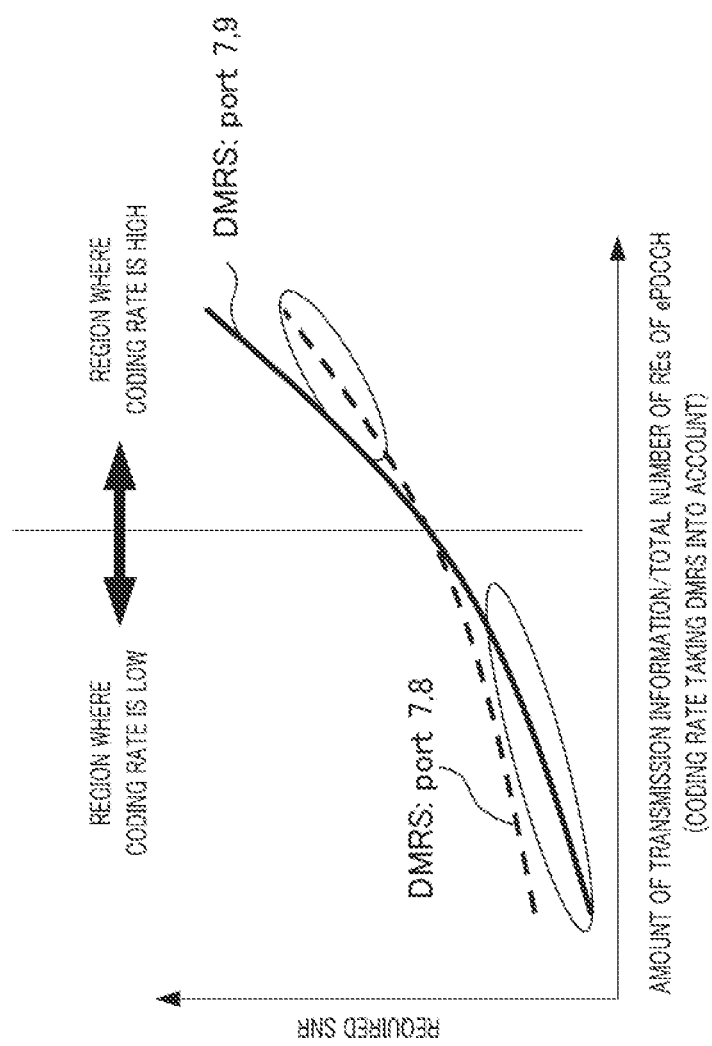
FIG. 8 illustrates a relationship between a coding rate and a required SNR according to Embodiment 1 of the present invention.

Here, FIG. 8 illustrates a relationship between "amount of transmission information/total number of REs for ePDCCH" (horizontal axis) and required SNR (vertical axis) which indicates the coding rate of ePDCCH with DMRS taken into account in FIG. 6A and FIG. 7A. In FIG. 8, the solid line shows characteristics when antenna ports 7 and 9 are assigned to DMRS (FIG. 6A) and the broken line shows characteristics when antenna ports 7 and 8 are assigned to DMRS (FIG. 7A).

In the region shown in FIG. 8 where the coding rate is high, the reception quality (e.g., SNR) of terminal 200 is estimated to be favorable. That is, in the region shown in FIG. 8 where the coding rate is high, the channel estimation accuracy is estimated to be favorable in both a case where DMRSs are assigned to antenna ports 7 and 9 (solid line) and a case where DMRSs are assigned to antenna ports 7 and 8 (broken line). Thus, in the region shown in FIG. 8 where the coding rate is high, in order to improve reception characteristics of terminal 200, it is more effective to increase the number of REs for ePDCCH per CCE, reduce the coding rate and obtain a coding gain than to obtain an effect of improving channel estimation accuracy. As described above, in the region shown in FIG. 8 where the coding rate is high, the required SNR at the same coding rate is lower (portion enclosed by an oval of solid line in the region where the coding rate is high) in the case where DMRSs are assigned to antenna ports 7 and 8 (broken line) compared to the case where DMRSs are assigned to antenna ports 7 and 9 (solid line).

On the other hand, in the region shown in FIG. 8 where the coding rate is low, the reception quality (e.g., SNR) of terminal 200 is estimated to be poor. That is, in the region shown in FIG. 8 where the coding rate is low, channel estimation accuracy is estimated to be poor in both a case where DMRSs are assigned to antenna ports 7 and 9 (solid line) and a case where DMRSs are assigned to antenna ports 7 and 8 (broken line). Furthermore, in the region shown in FIG. 8 where the coding rate is low, the degree of change of required SNR with respect to a change of the coding rate compared to the region where the coding rate is high. Thus, in the region shown in FIG. 8 where the coding rate is low, in order to improve the reception characteristics of terminal 200, it is more effective to improve channel estimation accuracy even when the coding rate slightly increases. As described above, in the region shown in FIG. 8 where the coding rate is low, the required SNR at the same coding rate is lower (portion enclosed by an oval of solid line in the region where the coding rate is low) in the case where DMRSs are assigned to antenna ports 7 and 9 (solid line) compared to the case where DMRSs are assigned to antenna ports 7 and 8 (broken line).

That is, in the region shown in FIG. 8 where the coding rate is low (that is, in the case where poor reception quality is estimated), it is more effective to assign DMRSs to non-code-multiplexed antenna ports 7 and 9 and apply power boosting to thereby improve reception characteristics of terminal 200. In contrast, in the region shown in FIG. 8 where the coding rate is high (that is, in a case where favorable reception quality is estimated), it is more effective to assign DMRSs to code-multiplexed antenna ports 7 and 8, reduce overhead of DMRSs, and reduce the coding rate to thereby improve reception characteristics of terminal 200.

Thus, in the present embodiment, attention is focused on the fact that within a PRB pair, an appropriate number of REs assigned to each of DMRS and ePDCCH differs depending on the reception quality (coding rate of ePDCCH (SNR region)) of terminal 200.

Thus, in the present embodiment, base station 100 configures DMRS antenna ports in ePDCCH (resource positions of DMRSs) based on the reception quality of terminal 200. More specifically, base station 100 (configuration section 102) configures code-multiplexed antenna ports 7 and 8 as DMRS antenna ports when the reception quality of terminal 200 satisfies a predetermined reference (when the reception quality is favorable). On the other hand, base station 100 (configuration section 102) configures non-code-multiplexed antenna ports 7 and 9 as DMRS antenna ports when the reception quality of terminal 200 does not satisfy the predetermined reference (when the reception quality is poor).

DMRS antenna port information indicating a combination of antenna ports configured in DMRS antenna ports is indicated from base station 100 to terminal 200.

On the other hand, in terminal 200, control signal processing section 205 identifies antenna ports (resource positions) to which DMRSs are assigned based on DMRS antenna port information indicated from base station 100 and also identifies resources to which ePDCCH is mapped. More specifically, control signal processing section 205 identifies DMRSs using one of code-multiplexed antenna ports 7 and 8, and non-code-multiplexed antenna ports 7 and 9 as DMRS antenna ports based on reception quality of terminal 200. That is, control signal processing section 205 demodulates DMRSs using code-multiplexed antenna ports 7 and 8 as DMRS antenna ports when reception quality of terminal 200 satisfies a predetermined reference (when reception quality is favorable). On the other hand, when the reception quality of terminal 200 does not satisfy the predetermined reference (when the reception quality is poor), control signal processing section 205 demodulates DMRSs using non-code-multiplexed antenna ports 7 and 9 as DMRS antenna ports.

As described above, in the present embodiment, base station 100 selects DMRS antenna ports (resource positions) based on reception quality of terminal 200. Thus, when the reception quality of terminal 200 is favorable (high SNR), it is possible to improve reception characteristics of terminal 200 by improving a coding gain, whereas when the reception quality of terminal 200 is poor (low SNR), it is possible to improve reception characteristics of terminal 200 by improving channel estimation accuracy.

Thus, according to the present embodiment, it is possible to improve reception characteristics of terminal 200 in transmission diversity in ePDCCH using two antenna ports.

A case has been described in the present embodiment where when code-multiplexed antenna ports 7 and 8 are configured as DMRS antenna ports, for example, resources (RE) corresponding to antenna ports 9 and 10 not used as DMRS antenna ports are used as resources for ePDCCH of terminal 200. However, resources corresponding to antenna ports 9 and 10 not used as DMRS antenna ports are not limited to the case where they are used as resources for ePDCCH of terminal 200.

Figure 9:
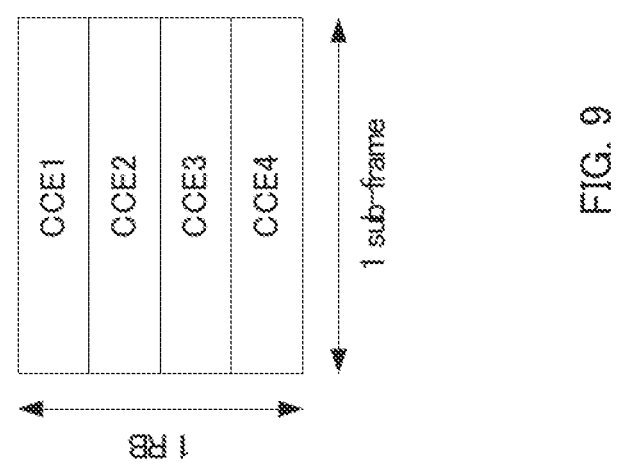
FIG. 9 illustrates an example of CCEs constituting one PRB pair according to Embodiment 1 of the present invention.

For example, in order to improve resources utilization efficiency, it is required to allow a plurality of ePDCCHs to be multiplexed within the same PRB pair. For example, FIG. 9 illustrates an example where one PRB pair is divided into four CCEs 1 to 4. In this case, base station 100 may transmit ePDCCHs intended for a plurality of terminals multiplexed within the same PRB pair. However, when ePDCCHs intended for a plurality of terminals of different transmission methods are multiplexed within the same PRB pair, a certain configuration of DMRS antenna ports may affect reception characteristics of each terminal. This case will be described more specifically hereunder.

Here, a case will be described by way of example where two-antenna port transmission diversity is configured for terminal A and single-antenna port transmission is configured for terminal B.

Figure 10B:
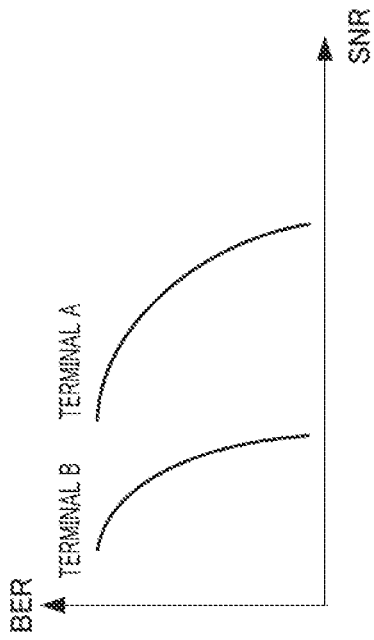
FIGS. 10A and 10B illustrate BER characteristics according to Embodiment 1 of the present invention.
Figure 10A:
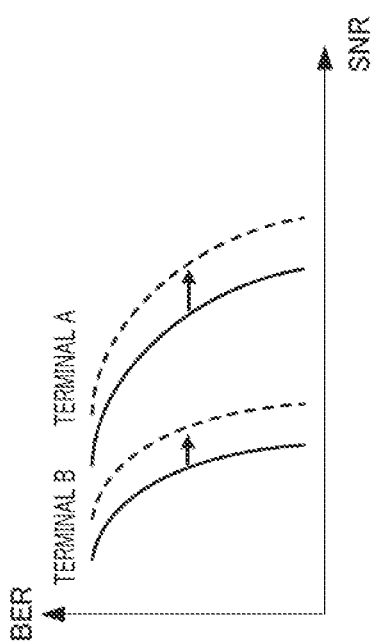

For example, when non-code-multiplexed antenna ports 7 and 9 are used as DMRS antenna ports for terminal A, antenna port 8 or 10 needs to be used as a DMRS antenna port for terminal B. In this case, even when terminal B uses one of antenna ports 8 and 10 as the DMRS antenna port, DMRSs are mapped to and code-multiplexed on the same RE for terminal A and terminal B. For this reason, although power boosting is applicable when only the respective configurations of DMRS antenna ports of terminal A and terminal B are taken into consideration, power boosting is not applicable when the configurations of both DMRS antenna ports of terminal A and terminal B are taken into consideration. For this reason, transmission power of DMRS for terminal A and terminal B need to be reduced. Thus, as shown in FIG. 10A, when terminal A and terminal B are multiplexed (broken line), channel estimation accuracy deteriorates and a BER (Bit Error Rate) characteristic of each terminal deteriorates compared to the case where terminal A and terminal B are not multiplexed (solid line).

On the other hand, when code-multiplexed antenna ports 7 and 8 are used as DMRS antenna ports for terminal A, antenna port 9 or 10 needs to be used as a DMRS antenna port for terminal B. In this case, since DMRSs are mapped to different REs between terminal A and terminal B, the antenna ports are not mutually code-multiplexed. For this reason, since power boosting is applicable to both terminal A and terminal B, transmission power of DMRSs for terminal A and terminal B need not be reduced. Thus, as shown in FIG. 10B, even when terminal A and terminal B are multiplexed (broken line), it is possible to maintain the channel estimation accuracy and maintain the BER characteristic of each terminal compared to the case where terminal A and terminal B are not multiplexed (solid line).

Thus, when configuring non-code-multiplexed antenna ports 7 and 8 for terminal A (terminal 200), base station 100 (configuration section 102) may configure one of antenna ports 9 and 10 other than antenna ports 7 and 8 as an antenna port to be used for transmission of a signal intended for other terminal B configured with single-antenna port transmission. By so doing, since ePDCCH intended for each terminal is transmitted using non-code-multiplexed DMRS antenna ports between the terminals, power boosting is applicable and transmission power of DMRS need not be reduced. For this reason, each terminal can maintain channel estimation accuracy equivalent to that in the case where a plurality of terminals are not multiplexed.

In the present embodiment, when carrier aggregation (CA) is applied whereby a plurality of component carriers (CC) are used while bundled together, base station 100 configures DMRS antenna ports in ePDCCH based on reception quality for each CC to which terminal 200 can be assigned. More specifically, when reception quality of CCs for transmitting ePDCCH of terminal 200 satisfies a predetermined reference (when reception quality is favorable), configuration section 102 configures code-multiplexed antenna ports 7 and 8 as DMRS antenna ports using information relating to reception quality for each CC to which terminal 200 can be assigned, the information being inputted from error correction decoding section 112 and reported from each terminal 200. On the other hand, when the reception quality of CCs for transmitting ePDCCH of terminal 200 does not satisfy the predetermined reference (when reception quality is poor), configuration section 102 configures non-code-multiplexed antenna ports 7 and 9 as DMRS antenna ports. Then, DMRS antenna port information indicating a combination of antenna ports configured as DMRS antenna ports is indicated from base station 100 to terminal 200 in units of CCs by RRC signaling. On the other hand, in terminal 200, control signal processing section 205 identifies antenna ports (resource positions) to which DMRSs are assigned based on DMRS antenna port information of CC whereby ePDCCH indicated from base station 100 is transmitted, and performs reception processing. This makes it possible to switch between DMRS antenna ports for each CC and perform operations of DMRS antenna ports differing from one CC to another.

In the present embodiment, base station 100 may not indicate terminal 200 of DMRS antenna port information, and terminal 200 may perform demodulation processing assuming both the case where DMRS antenna ports are antenna ports 7 and 8 and the case where DMRS antenna ports are antenna ports 7 and 9, and then extract (blind-decode) control signals. This eliminates the necessity for indication of DMRS antenna port information.

In the present embodiment, when performing explicit indication of DMRS antenna port information by RRC (Radio Resource Control) signaling, terminal 200 may use DMRS antenna port information indicated before the signaling for a predetermined period immediately after receiving the signaling. This is because the predetermined period after the signaling corresponds to a period (indeterminate period) during which base station 100 cannot determinately recognize whether or not terminal 200 has reflected signaling contents from base station 100. That is, terminal 200 uses DMRS antenna port information before the signaling as exception handing for a predetermined period (indeterminate period) immediately after receiving the signaling. Thus, base station 100 can correctly receive an uplink signal even for an indeterminate period immediately after the signaling. Note that terminal 200 may perform demodulation processing without using the DMRS antenna port information for the above-described indeterminate period, assuming both the case where the DMRS antenna ports are antenna ports 7 and 8, and the case where the DMRS antenna ports are antenna ports 7 and 9, and then extract (blind-decode) control signals. In this way, base station 100 can correctly receive an uplink signal based on latest DMRS antenna port information even for an indeterminate period immediately after the signaling.

Embodiment 2

Since a base station and a terminal according to the present embodiment have basic configurations common to those of base station 100 and terminal 200 according to Embodiment 1, the configurations thereof will be described with reference to FIG. 4 and FIG. 5.

The present embodiment uses aggregation levels configured in terminal 200 in ePDCCH as reception quality information generated in configuration section 102.

An aggregation level indicates the number of CCEs (resource amount) used for transmission of ePDCCH. Thus, when reception quality of terminal 200 is poor, the aggregation level is set to be high to decrease a coding rate. On the other hand, when reception quality of terminal 200 is favorable, the aggregation level is set to be low to increase the coding rate.

Thus, in base station 100, configuration section 102 configures DMRS ports to be used for terminal 200 according to an aggregation level of terminal 200. More specifically, when the aggregation level is equal to or greater than a predetermined threshold NA (when the reception quality is poor), configuration section 102 configures non-code-multiplexed antenna ports 7 and 9 as DMRS antenna ports. On the other hand, when the aggregation level is less than the predetermined threshold NA (when the reception quality is favorable), configuration section 102 configures code-multiplexed antenna ports 7 and 8 as DMRS antenna ports.

Terminal 200 performs blind decoding regarding a predetermined aggregation level. Thus, in terminal 200, control signal processing section 205 identifies antenna ports (resource positions) to which DMRSs are assigned based on an aggregation level at which blind decoding is performed, and also identifies resources to which ePDCCH is mapped. That is, when the aggregation level is equal to or greater than a predetermined threshold NA (when the reception quality is poor), terminal 200 identifies non-code-multiplexed antenna ports 7 and 9 as DMRS antenna ports. When the aggregation level is less than the predetermined threshold NA (when the reception quality is favorable), terminal 200 identifies code-multiplexed antenna ports 7 and 8 as DMRS antenna ports.

Note that the aggregation level configured in terminal 200 may be indicated beforehand from base station 100 to terminal 200 by higher layer signaling or the like. This allows terminal 200 to reduce the number of times blind decoding is performed.

A case will be described as an example where there are four levels 1, 2, 4 and 8 as the aggregation levels (e.g., see NPL 1). Suppose the predetermined threshold NA is 2.

When the aggregation level of terminal 200 is 1, since the aggregation level is less than the threshold NA, configuration section 102 configures antenna ports 7 and 8 as DMRS antenna ports. Thus, for example, base station 100 assigns data signals to resources corresponding to remaining antenna ports 9 and 10 for terminal 200, and can thereby lower the coding rate of ePDCCH. That is, it is possible to reduce the resource amount used for DMRS and improve a coding gain. Furthermore, when the aggregation level is 1, the reception quality of terminal 200 is estimated to be favorable. For this reason, terminal 200 can secure favorable channel estimation accuracy without applying power boosting to DMRS.

On the other hand, when the aggregation level of terminal 200 is 8, since the aggregation level is equal to or greater than the threshold NA, configuration section 102 configures antenna ports 7 and 9 as DMRS antenna ports. When the aggregation level is 8 (that is, when the coding rate is low), the reception quality of terminal 200 is estimated to be poor. Thus, when the aggregation level is 8, terminal 200 can improve channel estimation accuracy by applying power boo sting to DMRS. The same applies to cases where the aggregation level is 2 or 4.

By this means, in the present embodiment, base station 100 selects DMRS antenna ports (resource positions) based on the aggregation level configured in terminal 200. In this way, when the aggregation level is low (when the reception quality is favorable, high SNR), it is possible to improve the coding gain and thereby improve reception characteristics of terminal 200, whereas when the aggregation level is high (when the reception quality is poor, low SNR), it is possible to improve channel estimation accuracy and thereby improve reception characteristics of terminal 200. Thus, according to the present embodiment as well as Embodiment 1, it is possible to improve reception characteristics of terminal 200 when performing transmission diversity in ePDCCH using two antenna ports.

According to the present embodiment, an aggregation level is used as a configuration reference of DMRS antenna ports. That is, in the present embodiment, terminal 200 performs demodulation processing and blind decoding regarding a predetermined aggregation level using corresponding DMRS antenna ports, thus eliminating the necessity for indication of DMRS antenna port information from base station 100 to terminal 200. Furthermore, when the aggregation level is indicated beforehand from base station 100 to terminal 200, it is possible to reduce the number of times terminal 200 performs blind decoding.

Embodiment 3

Since a base station and a terminal according to the present embodiment have basic configurations common to those of base station 100 and terminal 200 according to Embodiment 1, the configurations thereof will be described with reference to FIG. 4 and FIG. 5.

The present embodiment uses a CQI value (e.g., latest CQI value) reported from terminal 200 as reception quality information generated in configuration section 102.

A value corresponding to reception quality of terminal 200 is set as the CQI value to be reported from terminal 200. Here, the greater the CQI value, the better is reception quality of terminal 200. For example, when the CQI value is less than a predetermined value, the reception quality of terminal 200 is poor, whereas when the CQI value is equal to or greater than the predetermined value, the reception quality of terminal 200 is favorable.

In base station 100, configuration section 102 configures DMRS ports to be used for terminal 200 according to the CQI value reported from terminal 200. More specifically, when the latest CQI value reported from terminal 200 is less than a predetermined threshold NC (when reception quality is poor), configuration section 102 configures non-code-multiplexed antenna ports 7 and 9 as DMRS antenna ports. On the other hand, when the latest CQI value reported from terminal 200 is equal to or greater than the threshold NC (when the reception quality is favorable), configuration section 102 configures code-multiplexed antenna ports 7 and 8 as DMRS antenna ports.

On the other hand, in terminal 200, control signal processing section 205 identifies antenna ports (resource positions) to which DMRSs are assigned based on the latest CQI value reported to base station 100 and also identifies resources to which ePDCCH is mapped. That is, when the latest CQI value is less than the predetermined threshold NC (when reception quality is poor), terminal 200 identifies non-code-multiplexed antenna ports 7 and 9 as DMRS antenna ports. When the latest CQI value is equal to or greater than the threshold NC (when the reception quality is favorable), terminal 200 identifies code-multiplexed antenna ports 7 and 8 as DMRS antenna ports.

By this means, in the present embodiment, base station 100 selects DMRS antenna ports (resource positions) based on the CQI value reported from terminal 200. Thus, when the CQI value is large (reception quality is favorable, high SNR), it is possible to improve the coding gain and thereby improve reception characteristics of terminal 200, whereas when the CQI value is small (reception quality is poor, low SNR), it is possible to improve channel estimation accuracy and thereby improve reception characteristics of terminal 200. Thus, according to the present embodiment as well as Embodiment 1, it is possible to improve reception characteristics of terminal 200 when performing transmission diversity in ePDCCH using two antenna ports.

According to the present embodiment, a CQI value reported from terminal 200 to base station 100 is used as a configuration reference of DMRS antenna ports. That is, the present embodiment uses information common to base station 100 and terminal 200 as a configuration reference of DMRS antenna ports, and thereby eliminates the necessity for indication of DMRS antenna port information from base station 100 to terminal 200.

Embodiment 4

Since a base station and a terminal according to the present embodiment have basic configurations common to those of base station 100 and terminal 200 according to Embodiment 1, the configurations thereof will be described with reference to FIG. 4 and FIG. 5.

The present embodiment uses the number of CCEs used for terminal 200 among a plurality of CCEs forming one PRB pair, that is, the number of CCEs used for terminal 200 per PRB pair as reception quality information generated in configuration section 102.

When reception quality of terminal 200 is poor, a signal intended for terminal 200 is estimated to be transmitted using more CCEs to reduce the coding rate. On the other hand, when reception quality of terminal 200 is favorable, a signal intended for terminal 200 is estimated to be transmitted using fewer CCEs to increase the coding rate.

Thus, in base station 100, configuration section 102 configures DMRS ports to be used for terminal 200 in accordance with the number of CCEs per PRB pair used for transmission intended for terminal 200. More specifically, when the number of CCEs used by terminal 200 per PRB pair is equal to or greater than a predetermined threshold N (reception quality is poor), configuration section 102 configures non-code-multiplexed antenna ports 7 and 9 as DMRS antenna ports. When the number of CCEs used by terminal 200 per PRB pair is less than the threshold N (when the reception quality is favorable), configuration section 102 configures code-multiplexed antenna ports 7 and 8 as DMRS antenna ports.

Terminal 200 recognizes the number of CCEs used by terminal 200 per PRB pair beforehand and performs blind decoding on a control signal. That is, terminal 200 knows the number of CCEs used by terminal 200 per PRB pair which is a configuration reference of DMRS antenna ports beforehand. Thus, in terminal 200, control signal processing section 205 identifies antenna ports (resource positions) to which DMRSs are assigned, based on the number of CCEs per PRB pair configured in terminal 200 and also identifies resources to which ePDCCH is mapped. That is, when the number of CCEs per PRB pair is equal to or greater than a predetermined threshold N (when reception quality is poor), terminal 200 identifies non-code-multiplexed antenna ports 7 and 9 as DMRS antenna ports. On the other hand, when the number of CCEs per PRB pair is less than the threshold N (when the reception quality is favorable), terminal 200 identifies code-multiplexed antenna ports 7 and 8 as DMRS antenna ports.

As an example, as shown in FIG. 9, a case where one PRB pair is divided into four CCEs 1 to 4 will be described. Suppose the predetermined threshold N is 4.

When the number of CCEs used by terminal 200 per PRB pair is 1 to 3, since the number of CCEs is less than the threshold N, configuration section 102 configures antenna ports 7 and 8 as DMRS antenna ports. As described above, when the number of CCEs used by terminal 200 per PRB pair is 1 to 3, the reception quality of terminal 200 is estimated to be favorable. For this reason, antenna ports 7 and 8 are configured as DMRS antenna ports, and it is thereby possible to improve the coding gain while ensuring favorable channel estimation accuracy in terminal 200 as in the case of Embodiment 1.

When the number of CCEs used by terminal 200 per PRB pair is one of 1 to 3, remaining one CCE other than CCEs used for terminal 200 in the PRB pair is more likely to be assigned to another terminal configured with single-antenna port transmission. That is, when the number of CCEs used by terminal 200 per PRB pair is less than the threshold N, base station 100 can transmit DMRSs to the other terminal configured with single-antenna port transmission using non-code-multiplexed antenna ports 9 and 10 other than code-multiplexed antenna ports 7 and 8 configured as DMRS antenna ports for terminal 200 and the remaining CCEs not used for terminal 200. This makes it possible to apply power boosting to DMRS intended for terminal 200 and DMRS intended for the above-described other terminal respectively, and thereby prevent deterioration of channel estimation accuracy due to a reduction in transmission power of DMRS at the time of multiplexing (e.g., see FIG. 10A).

On the other hand, when the number of CCEs used by terminal 200 per PRB pair is 4, since the number of CCEs is equal to or greater than the threshold N, configuration section 102 configures antenna ports 7 and 9 as DMRS antenna ports. It is thereby possible to improve channel estimation accuracy in terminal 200 by applying power boosting to DMRS intended for terminal 200. When the number of CCEs used by terminal 200 per PRB pair is equal to or greater than the threshold N, it is less likely that the remaining CCEs in the PRB pair other than the CCE used for terminal 200 will be assigned to the other terminal configured with single-antenna port transmission. Especially, when the number of CCEs used by terminal 200 per PRB pair is 4, all CCEs within one PRB pair are used for terminal 200 and no resource can be assigned to other terminals. For this reason, when non-code-multiplexed antenna ports 7 and 9 are configured as DMRS antenna ports for terminal 200, there is no chance that channel estimation accuracy will deteriorate due to a decrease in transmission power of DMRS when a plurality of terminals are multiplexed (e.g., see FIG. 10A).

Note that even when the use of antenna ports 7 and 8 as DMRS antenna ports is instructed from base station 100 to terminal 200 via a higher layer, if terminal 200 occupies all CCEs within one PRB pair as in the above-described example, there is no room for multiplexing signals intended for other terminal within the PRB pair. Thus, when terminal 200 occupies all CCEs within one PRB pair, base station 100 may configure DMRS antenna ports (e.g., antenna ports 7 and 9) where channel estimation accuracy can be expected to improve for terminal 200 irrespective of indication by a higher layer.

By this means, in the present embodiment, base station 100 selects DMRS antenna ports (resource positions) based on the number of CCEs used by terminal 200 per PRB pair. Thus, when the number of CCEs used by terminal 200 per PRB pair is small (reception quality is favorable, high SNR), it is possible to improve the coding gain to thereby improve reception characteristics of terminal 200, whereas when the number of CCEs used by terminal 200 per PRB pair is large (reception quality is poor, low SNR), it is possible to improve channel estimation accuracy to thereby improve reception characteristics of terminal 200. Thus, according to the present embodiment as well as Embodiment 1, it is possible to improve reception characteristics of terminal 200 when performing transmission diversity using two antenna ports in ePDCCH.

The present embodiment uses the number of CCEs used by terminal 200 per PRB pair which is a parameter recognized by terminal 200 beforehand as a configuration reference of DMRS antenna ports. That is, the present embodiment uses information common to base station 100 and terminal 200 as a configuration reference of DMRS antenna ports, and thereby eliminates the necessity for indication of DMRS antenna port information from base station 100 to terminal 200.

When the number of CCEs used by terminal 200 per PRB pair is small, the present embodiment uses code-multiplexed antenna ports as DMRS antenna ports for terminal 200. By so doing, even when a terminal configured with two-antenna port transmission and a terminal configured with single-antenna port transmission can be multiplexed, it is possible to select DMRS antenna ports for the terminal configured with two-antenna port transmission, so as to avoid deterioration of channel estimation accuracy of both terminals due to multiplexing (e.g., see FIG. 10A), and thereby improve resources utilization efficiency.

Embodiment 5

Since a base station and a terminal according to the present embodiment have basic configurations common to those of base station 100 and terminal 200 according to Embodiment 1, the configurations thereof will be described with reference to FIG. 4 and FIG. 5.

The present embodiment uses information indicating whether a subframe configured in terminal 200 is a low power ABS or a normal subframe (may also be referred to as "non ABS") as reception quality information generated in configuration section 102.

The low power ABS is a subframe in which ePDCCH or PDSCH is transmitted using power lower than that in a normal subframe for the purpose of reducing inter-cell interference. Therefore, the reception quality of terminal 200 configured with low power ABS may be estimated to be poorer than the reception quality of terminal 200 configured with a normal subframe. That is, in the present embodiment, when low power ABS is configured in terminal 200, reception quality of terminal 200 is estimated to be poor, whereas when a normal subframe is configured in terminal 200, the reception quality of terminal 200 is estimated to be favorable.

Thus, in base station 100, configuration section 102 configures DMRS ports used for terminal 200 in accordance with a subframe configured in terminal 200. More specifically, when a subframe configured in terminal 200 is a low power ABS (reception quality is poor), configuration section 102 configures non-code-multiplexed antenna ports 7 and 9 as DMRS antenna ports. On the other hand, when a subframe configured in terminal 200 is a normal subframe (when the reception quality is favorable), configuration section 102 configures code-multiplexed antenna ports 7 and 8 as DMRS antenna ports.

The information indicating whether a subframe configured in terminal 200 is a low power ABS or a normal subframe is indicated from base station 100 to terminal 200 beforehand. Thus, control signal processing section 205 in terminal 200 identifies antenna ports (resource positions) to which DMRSs are assigned based on the type of a subframe indicated in the indicated information and also identifies a resource to which ePDCCH is mapped. That is, when a low power ABS is configured (reception quality is poor), terminal 200 identifies non-code-multiplexed antenna ports 7 and 9 as DMRS antenna ports. On the other hand, when a normal subframe is configured (when the reception quality is favorable), terminal 200 identifies code-multiplexed antenna ports 7 and 8 as DMRS antenna ports.

By this means, in the present embodiment, base station 100 selects DMRS antenna ports (resource positions) based on the type of subframe configured in terminal 200. Thus, in the case of a normal subframe (reception quality is favorable, high SNR), it is possible to improve the coding gain to thereby improve reception characteristics of terminal 200, whereas in the case of a low power ABS (reception quality is poor, low SNR), it is possible to improve channel estimation accuracy to thereby improve reception characteristics of terminal 200. Thus, according to the present embodiment as well as Embodiment 1, it is possible to improve reception characteristics of terminal 200 in transmission diversity using two antenna ports in ePDCCH.

The present embodiment further uses information of subframes indicated beforehand from base station 100 to terminal 200 as a configuration reference of DMRS antenna ports. That is, the present embodiment uses information common to base station 100 and terminal 200 as a configuration reference of DMRS antenna ports, and thereby eliminates the necessity for indication of DMRS antenna port information from base station 100 to terminal 200.

Embodiment 6

Since a base station and a terminal according to the present embodiment have basic configurations common to those of base station 100 and terminal 200 according to Embodiment 1, the configurations thereof will be described with reference to FIG. 4 and FIG. 5.

In the present embodiment, a combination of DMRS antenna ports configured in terminal 200 is associated with ePDCCH resources (RB) configured in terminal 200.

Figure 11:
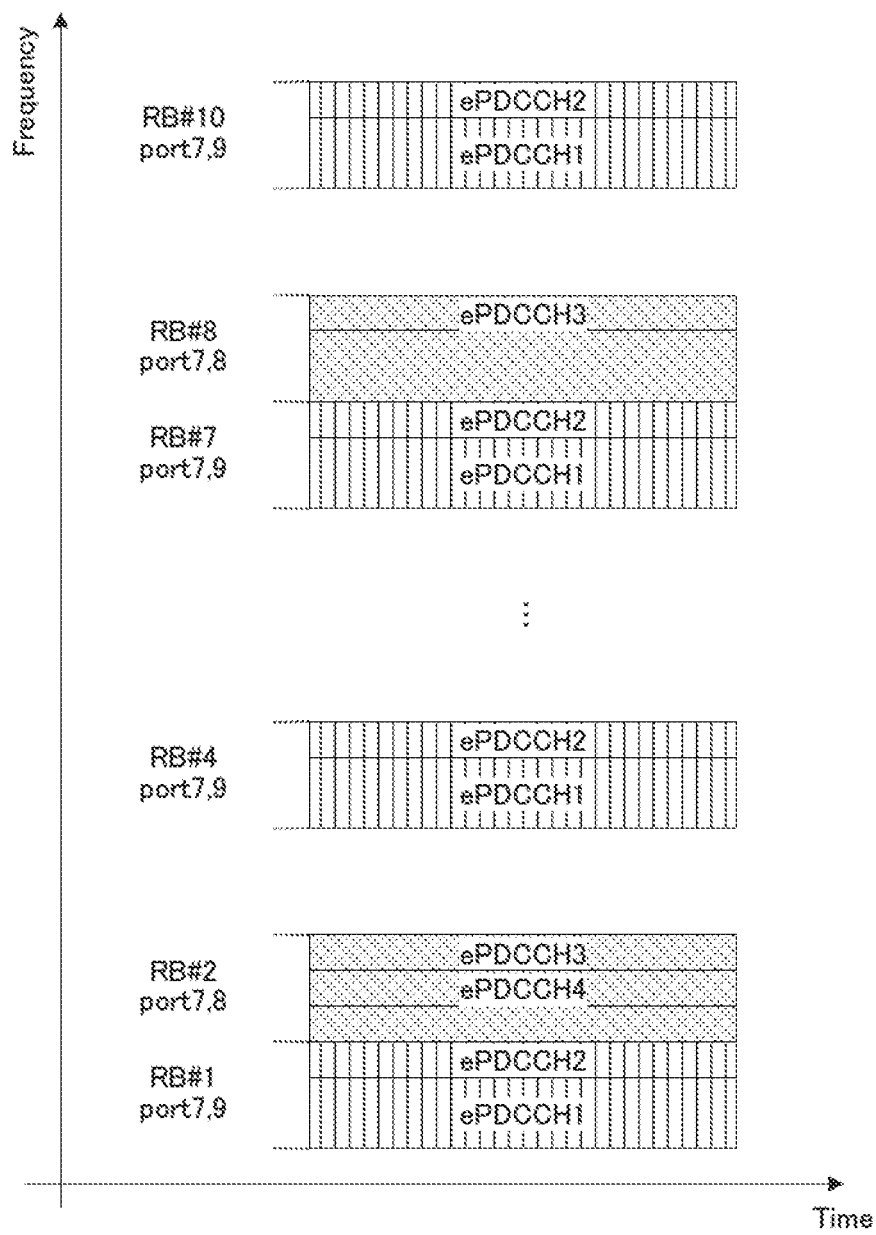
FIG. 11 illustrates examples of association between RBs and antenna ports according to Embodiment 6 of the present invention.

FIG. 11 illustrates an example of association between a combination of DMRS antenna ports configured in terminal 200 and ePDCCH resources (RBs) configured in terminal 200. In FIG. 11, a pair of code-multiplexed antenna ports 7 and 8 and a pair of non-code-multiplexed antenna ports 7 and 9 are used as combinations of DMRS antenna ports.

As shown in FIG. 11, antenna ports 7 and 9 (ports 7 and 9) are associated with RBs #1, #4, #7 and #10, and antenna ports 7 and 8 (ports 7 and 8) are associated with RBs #2 and #8. Thus, one of the pair of antenna ports 7 and 9, and the pair of antenna ports 7 and 8 is associated with each of a plurality of RBs which can be assigned to terminal 200.

Base station 100 configures association between a combination of DMRS antenna ports configured in terminal 200 and ePDCCH resources (RBs) configured in terminal 200 beforehand. Base station 100 then indicates terminal 200 of the above-described association beforehand via a higher layer. The above-described association is thus shared between base station 100 and terminal 200.

Base station 100 assigns resources (RBs) to be used for transmission of ePDCCH signals intended for each terminal 200 based on reception quality of each terminal 200. For example, in FIG. 11, suppose that ePDCCH1 is ePDCCH intended for a terminal having the worst reception quality among ePDCCH1 to ePDCCH4, ePDCCH2 is ePDCCH intended for a terminal having the second worst reception quality, ePDCCH3 is ePDCCH intended for a terminal having the third worst reception quality, and ePDCCH4 is ePDCCH intended for a terminal having the best reception quality. Note that as shown in FIG. 11, a terminal having poor reception quality (e.g., transmission target of ePDCCH1 or ePDCCH2) can also be said to be a terminal configured with a high aggregation level. Similarly, as shown in FIG. 11, a terminal having favorable reception quality (e.g., transmission target of ePDCCH3 or ePDCCH4) can also be said to be a terminal configured with a low aggregation level.

As shown in FIG. 11, base station 100 assigns one of RBs #1, #4, #7 and #10 to terminal 200 which is a transmission target of ePDCCH1 or ePDCCH2 (terminal having relatively poor reception quality), assigns one of RB #2 and RB #8 to terminal 200 which is a transmission target of ePDCCH3 (terminal having relatively favorable reception quality) and assigns RB #2 to terminal 200 which is a transmission target of ePDCCH4 (terminal having relatively favorable reception quality).

Next, base station 100 (configuration section 102) configures antenna ports associated with RBs assigned based on reception quality of terminal 200 as DMRS antenna ports. In FIG. 11, configuration section 102 configures antenna ports 7 and 9 associated with RBs #1, #4, #7 and #10 for terminal 200 which is a transmission target of ePDCCH1 or ePDCCH2. In FIG. 11, configuration section 102 configures antenna ports 7 and 8 associated with RB #2 and RB #8 for terminal 200 which is a transmission target of ePDCCH3 or ePDCCH4.

Thus, as shown in FIG. 11, base station 100 preferentially assigns resources associated with antenna ports 7 and 9 (one of RBs #1, #4, #7 and #10 in FIG. 11) to terminal 200 having poor reception quality. By so doing, terminal 200 can improve reception characteristics by improving channel estimation accuracy as in the case of Embodiment 1. On the other hand, as shown in FIG. 11, base station 100 preferentially assigns resources associated with antenna ports 7 and 8 (one of RB #2 and RB #8 in FIG. 11) to terminal 200 having favorable reception quality. By so doing, terminal 200 can improve reception characteristics by improving the coding gain as in the case of Embodiment 1.

On the other hand, terminal 200 (control signal processing section 205) detects a control signal (assignment information) intended for terminal 200 and identifies resources (RBs) assigned to ePDCCH intended for terminal 200. Terminal 200 (control signal processing section 205) identifies antenna ports associated with the identified resources as DMRS antenna ports with reference to the association between ePDCCH resources and DMRS antenna ports and identifies resources to which ePDCCH is mapped.

For example, in FIG. 11, when a resource assigned to ePDCCH intended for terminal 200 is one of RBs #1, #4, #7 and #10, terminal 200 identifies antenna ports 7 and 9 as DMRS antenna ports. Similarly, in FIG. 11, when a resource assigned to ePDCCH intended for terminal 200 is one of RBs #2 and #8, terminal 200 identifies antenna ports 7 and 8 as DMRS antenna ports.

This eliminates the necessity for indication of DMRS antenna port information from base station 100 to terminal 200.

Since the DMRS antenna port information described in Embodiment 1 needs to be indicated via a higher layer, it is not possible to speedily (e.g., in subframe units) switch between DMRS antenna ports for terminal 200. In contrast, the present embodiment can switch between DMRS antenna ports in accordance with resource allocation which can be controlled in subframe units. That is, it is possible to speedily switch between DMRS antenna ports for terminal 200.

Instead of indicating DMRS antenna port information, terminal 200 may perform blind decoding on all possible combinations as DMRS antenna ports (e.g., combination of antenna ports 7 and 8, and combination of antenna ports 7 and 9). However, in this case, although indication of DMRS antenna port information is unnecessary, the number of times terminal 200 performs demodulation processing and blind decoding increases. In contrast, in the present embodiment, since resources assigned to terminal 200 are associated with a combination of DMRS antenna ports in a one-to-one correspondence, it is possible to avoid an increase in the number of times demodulation processing, and blind decoding are performed.

According to the present embodiment as well as Embodiment 1, it is possible to improve reception characteristics of terminal 200 when performing transmission diversity using two antenna ports in ePDCCH.

In the present embodiment, it may be possible to change the distribution of RBs corresponding to the combination of non-code-multiplexed DMRS antenna ports (e.g., antenna ports 7 and 9) and RBs corresponding to the combination of code-multiplexed DMRS antenna ports (e.g., antenna ports 7 and 8) in accordance with a reception quality situation of terminal 200 under base station 100.

Embodiment 7

Since a base station and a terminal according to the present embodiment have basic configurations common to those of base station 100 and terminal 200 according to Embodiment 1, the configurations thereof will be described with reference to FIG. 4 and FIG. 5.

The present embodiment associates a combination of DMRS antenna ports configured in terminal 200 with component carriers (CCs) to which ePDCCH configured in terminal 200 can be allocated.

Figure 12:
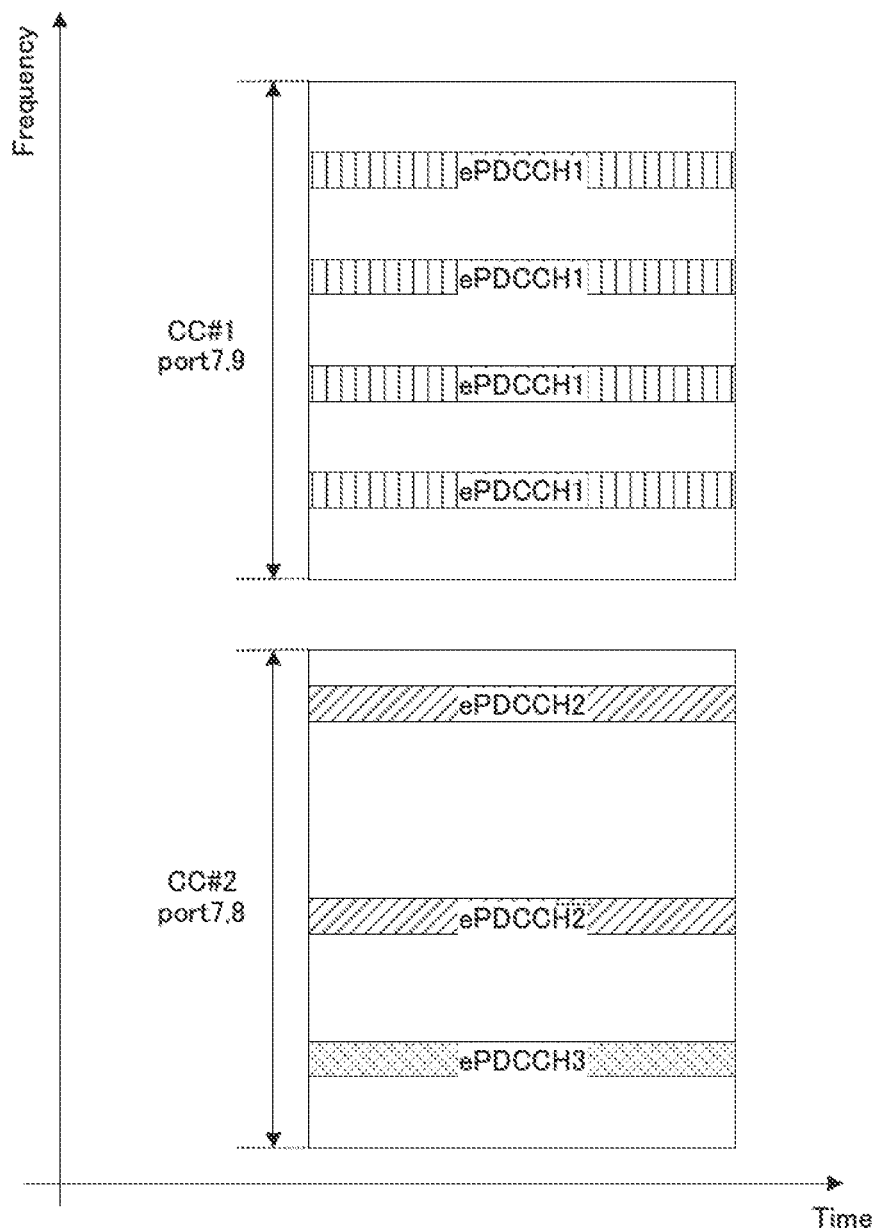
FIG. 12 illustrates examples of association between CCs and antenna ports according to Embodiment 7 of the present invention.

FIG. 12 illustrates an example of association between a combination of DMRS antenna ports configured in terminal 200 and CCs to which ePDCCH configured in terminal 200 can be allocated. In FIG. 12, a pair of code-multiplexed antenna ports 7 and 8 and a pair of non-code-multiplexed antenna ports 7 and 9 are used as combinations of DMRS antenna ports.

As shown in FIG. 12, antenna ports 7 and 9 (ports 7 and 9) are associated with CC #1 and antenna ports 7 and 8 (ports 7 and 8) are associated with CC #2. Thus, one of the pair of antenna ports 7 and 9, and the pair of antenna ports 7 and 8 is associated with each of the plurality of CCs that can be allocated to terminal 200.

Base station 100 configures beforehand, association between the combination of DMRS antenna ports configured in terminal 200 and CCs to which ePDCCH configured in terminal 200 can be allocated. Base station 100 then indicates the above-described association to terminal 200 beforehand via a higher layer. This allows base station 100 and terminal 200 to share the above-described association.

Base station 100 assigns CCs to be used for transmission of ePDCCH signals intended for each terminal 200 based on reception quality of each terminal 200. For example, in FIG. 12, of ePDCCH1 to ePDCCH3, ePDCCH1 is assumed to be ePDCCH intended for a terminal having the worst reception quality, ePDCCH2 is assumed to be ePDCCH intended for a terminal having the second worst reception quality, and ePDCCH3 is assumed to be ePDCCH intended for a terminal having the best reception quality. Note that the terminal having the worst reception quality (e.g., transmission target of ePDCCH1) can be said to be a terminal configured with a high aggregation level. Similarly, as shown in FIG. 12, the terminal having the best reception quality (e.g., transmission target of ePDCCH2 or ePDCCH3) can be said to be a terminal configured with a low aggregation level.

Thus, as shown in FIG. 12, base station 100 assigns CC #1 to terminal 200 which is a transmission target of ePDCCH1 (terminal having poor reception quality), assigns CC #2 to terminal 200 which is a transmission target of ePDCCH2 (terminal having relatively favorable reception quality) and assigns CC #2 to terminal 200 which is a transmission target of ePDCCH3 (terminal having favorable reception quality).

Next, base station 100 (configuration section 102) configures antenna ports associated with CCs assigned based on reception quality of terminal 200 as DMRS antenna ports. In FIG. 12, configuration section 102 configures antenna ports 7 and 9 associated with CC #1 for terminal 200 which is a transmission target of ePDCCH1. In FIG. 12, configuration section 102 configures antenna ports 7 and 8 associated with CC #2 for terminal 200 which is a transmission target of ePDCCH2 or ePDCCH3.

Thus, as shown in FIG. 12, base station 100 preferentially allocates resources associated with antenna ports 7 and 9 (CC #1 in FIG. 12) to terminal 200 having poor reception quality. By so doing, terminal 200 improves channel estimation accuracy, and can thereby improve reception characteristics as in the case of Embodiment 1. On the other hand, as shown in FIG. 12, base station 100 preferentially allocates resources associated with antenna ports 7 and 8 (CC #2 in FIG. 12) to terminal 200 having favorable reception quality. By so doing, terminal 200 improves the coding gain, and can thereby improve reception characteristics as in the case of Embodiment 1.

On the other hand, terminal 200 (control signal processing section 205) detects a control signal (assignment information) intended for terminal 200 and identifies component carriers (CCs) assigned to ePDCCH intended for terminal 200. With reference to association between CCs and DMRS antenna ports, terminal 200 (control signal processing section 205) identifies antenna ports associated with the identified CCs as DMRS antenna ports and identifies CCs to which ePDCCH is mapped.

For example, in FIG. 12, when CC allocated to ePDCCH intended for terminal 200 is CC #1, terminal 200 identifies antenna ports 7 and 9 as DMRS antenna ports. Similarly, in FIG. 12, when CC allocated to ePDCCH intended for terminal 200 is CC #2, terminal 200 identifies antenna ports 7 and 8 as DMRS antenna ports.

This eliminates the necessity for indication of DMRS antenna port information from base station 100 to terminal 200.

The DMRS antenna port information described in Embodiment 1 needs to be indicated via a higher layer, and it is thereby not possible to speedily (e.g., in subframe units)

switch between DMRS antenna ports for terminal 200. In contrast, the present embodiment can switch between DMRS antenna ports in accordance with CC allocation which is controllable in subframe units. That is, it is possible to speedily switch between DMRS antenna ports for terminal 200.

Instead of indicating DMRS antenna port information, terminal 200 may perform blind decoding on all possible combinations as DMRS antenna ports (e.g., combination of antenna ports 7 and 8, and combination of antenna ports 7 and 9). However, in this case, although indication of DMRS antenna port information is unnecessary, the number of times terminal 200 performs demodulation processing and blind decoding increases. In contrast, in the present embodiment, since a CC allocated to terminal 200 and a combination of DMRS antenna ports are associated with each other in a one-to-one correspondence, and it is thereby possible to avoid increases in the number of times demodulation processing and blind decoding are performed.

According to the present embodiment as well as Embodiment 1, it is possible to improve reception characteristics of terminal 200 when performing transmission diversity using two antenna ports in ePDCCH.

In the present embodiment, the distribution of CCs corresponding to a combination of non-code-multiplexed DMRS antenna ports (e.g., antenna ports 7 and 9) and CCs corresponding to a combination of code-multiplexed DMRS antenna ports (e.g., antenna ports 7 and 8) may be changed in accordance with a reception quality situation for each component carrier of terminal 200 under base station 100.

Figure 13:
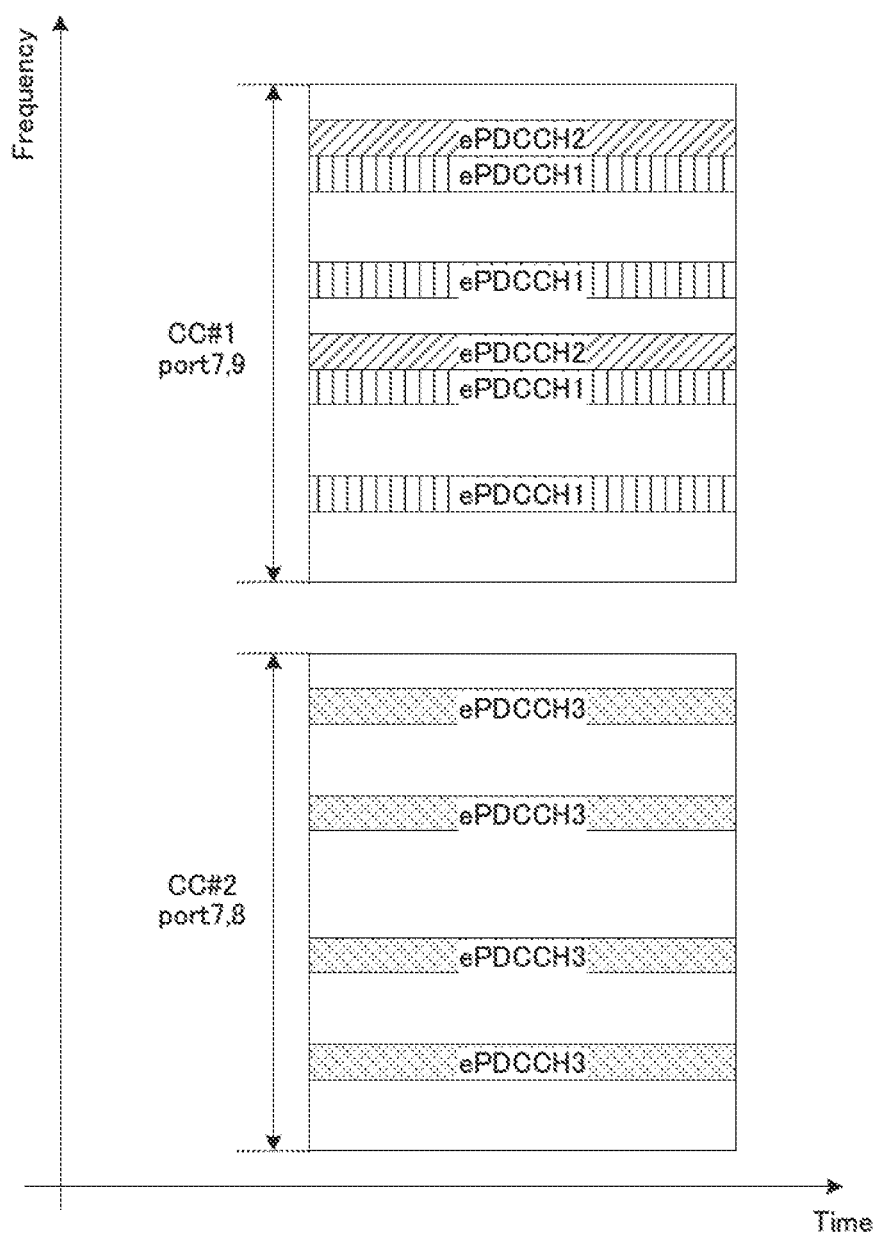
FIG. 13 illustrates more examples of association between CCs and antenna ports according to Embodiment 7 of the present invention.

In FIG. 12, an example has been described in the present embodiment where CC #1 is allocated to a terminal having poor reception quality and CC #2 is allocated to a terminal having relatively favorable reception quality and a terminal having favorable reception quality, but the present invention is not limited to this. For example, as shown in FIG. 13, CC #1 may be allocated to a terminal having poor reception quality (terminal 200 which is a transmission target of ePDCCH1) and a terminal having relatively favorable reception quality (terminal 200 which is a transmission target of ePDCCH2) and CC #2 may be allocated to a terminal having favorable reception quality (terminal 200 which is a transmission target of ePDCCH3). That is, a CC that includes each ePDCCH may be changed depending on reception quality of each component carrier of terminal 200 served by base station 100 and the number of terminals corresponding to the reception quality. When making such a change, information relating to the association between ePDCCHs and CCs may be indicated to terminal 200.

Embodiment 8

In Embodiment 6, association between each RB for ePDCCH and a combination of DMRS antenna ports needs to be indicated beforehand from base station 100 to terminal 200. When indicating the above-described association, it is necessary to indicate for each RB, information (1 bit) indicating whether a combination of non-code-multiplexed DMRS antenna ports (e.g., antenna ports 7 and 9) is associated or a combination of code-multiplexed DMRS antenna ports (e.g., antenna ports 7 and 8) is associated. Thus, when N RBs are used in ePDCCH, N bits are necessary to indicate the above-described association.

In the present embodiment, a method will be described which reduces the number of bits required to indicate association between each RB for ePDCCH and a combination of DMRS antenna ports as in the case of Embodiment 6.

Since a base station and a terminal according to the present embodiment have basic configurations common to those of base station 100 and terminal 200 according to Embodiment 1, the configurations thereof will be described with reference to FIG. 4 and FIG. 5.

Figure 14:
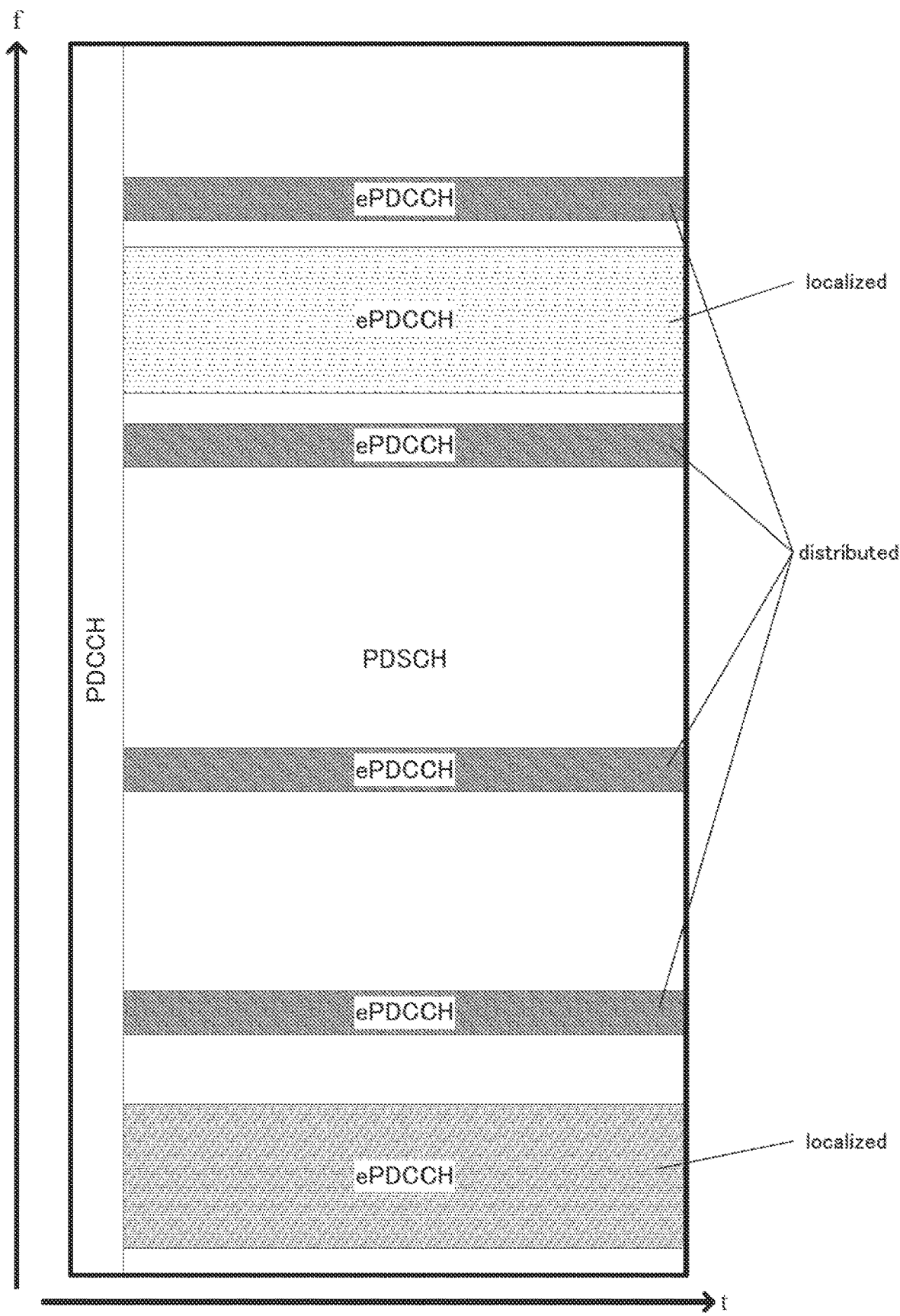
FIG. 14 illustrates examples of an ePDCCH allocation method.

Here, studies are being carried out on "localized allocation" which allocates in a localized manner ePDCCHs at positions close to each other in a frequency band and "distributed allocation" which allocates in a distributed manner ePDCCHs in a frequency band as ePDCCH allocation methods (e.g., see FIG. 14). The localized allocation is an allocation method for obtaining a frequency scheduling gain, and can be used to allocate an ePDCCH to a resource that has favorable channel quality based on channel quality information. The distributed allocation distributes ePDCCHs on the frequency axis, and can obtain a frequency diversity gain. In the LTE-Advanced system, both the localized allocation and the distributed allocation may be configured (for example, see FIG. 3).

That is, the localized allocation is an allocation method for obtaining a frequency scheduling gain, and can be used to allocate an ePDCCH to a resource that has favorable channel quality based on channel quality information, and is therefore an allocation method effective for a terminal having favorable reception quality and having a high coding rate.

On the other hand, the distributed allocation distributes ePDCCHs on the frequency axis, obtains a frequency diversity gain and thereby has an effect of stabilizing reception quality, and is therefore an allocation method effective for a terminal having poor reception quality and having a low coding rate.

Whether each RB for ePDCCH is configured by localized allocation or distributed allocation is explicitly or implicitly indicated to terminal 200.

In the present embodiment, a combination of DMRS antenna ports configured in terminal 200 and an ePDCCH allocation method (localized allocation or distributed allocation) configured in terminal 200 are associated with each other.

Figure 15:
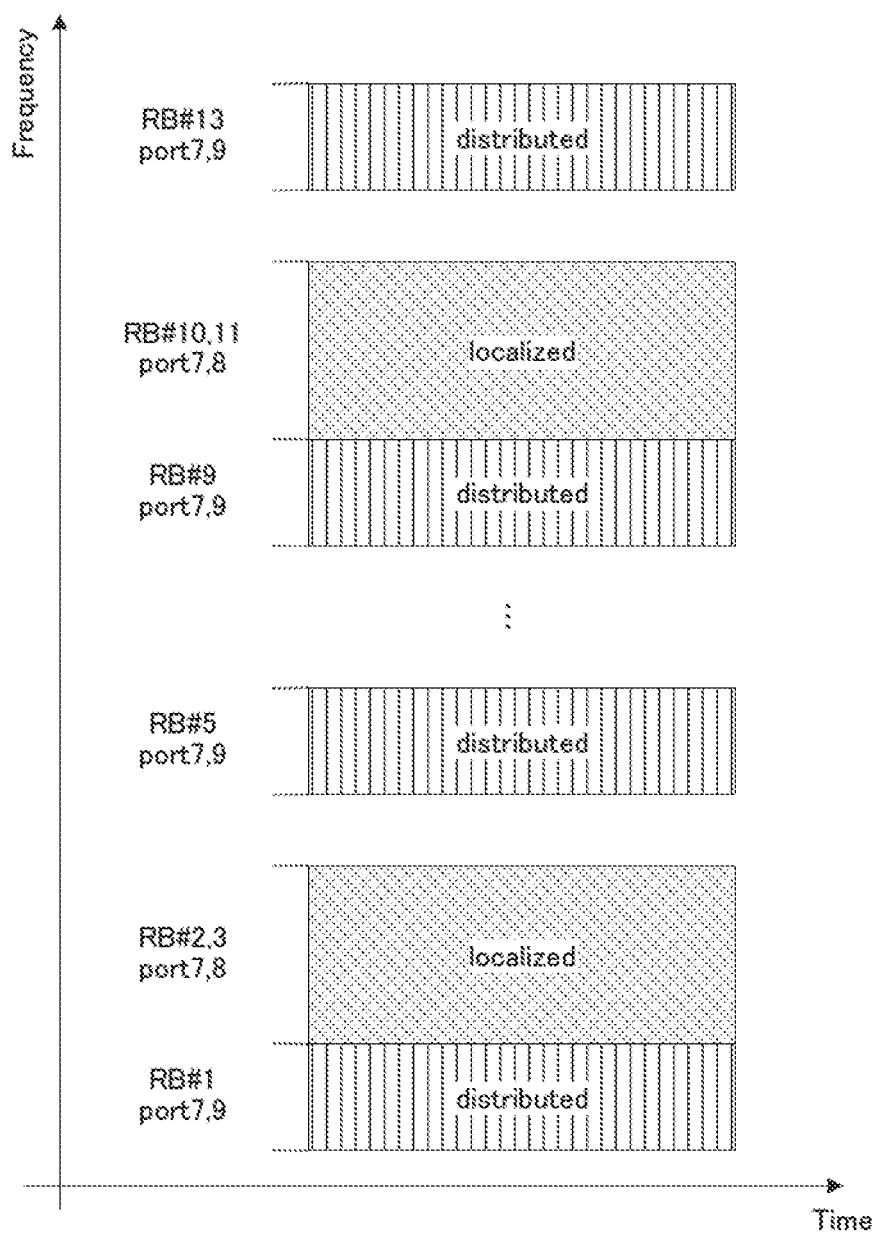
FIG. 15 illustrates examples of association between ePDCCH allocation methods and antenna ports according to Embodiment 8 of the present invention.

FIG. 15 illustrates an example of association between a combination of DMRS antenna ports configured in terminal 200 and an ePDCCH allocation method configured in terminal 200. In FIG. 15, a pair of code-multiplexed antenna ports 7 and 8 and a pair of non-code-multiplexed antenna ports 7 and 9 are used as combinations of DMRS antenna ports. In FIG. 15, localized allocation and distributed allocation are configured as the ePDCCH allocation methods.

As shown in FIG. 15, non-code-multiplexed antenna ports 7 and 9 (ports 7 and 9) are associated with distributed allocation and code-multiplexed antenna ports 7 and 8 (ports 7 and 8) are associated with localized allocation. In this case, information (1 bit) may be indicated for each ePDCCH allocation method, which indicates whether the combination of non-code-multiplexed DMRS antenna ports (e.g., antenna ports 7 and 9) is associated or a combination of code-multiplexed DMRS antenna ports (e.g., antenna ports 7 and 8) is associated. That is, bits necessary to indicate the above-described association from base station 100 to terminal 200 may be not more than 2 bits regardless of the number of RBs for ePDCCH.

Base station 100 configures beforehand, association between a combination of DMRS antenna ports configured in terminal 200 and an ePDCCH allocation method configured in terminal 200. Base station 100 then indicates terminal 200 of the above-described association beforehand via a higher layer. This allows base station 100 and terminal 200 to share the above-described association.

As in the case of Embodiment 6, base station 100 allocates resources (RBs) to be used for transmission of ePDCCH signals intended for each terminal 200 based on reception quality of each terminal 200. Base station 100 (configuration section 102) configures antenna ports associated with the ePDCCH allocation method configured in terminal 200 as DMRS antenna ports.

In FIG. 15, base station 100 (configuration section 102) configures antenna ports 7 and 9 for a terminal configured with distributed allocation (terminal having relatively poor reception quality) as DMRS antenna ports. By so doing, terminal 200 improves channel estimation accuracy, and can thereby improve reception characteristics as in the case of Embodiment 1. On the other hand, in FIG. 15, base station 100 (configuration section 102) configures antenna ports 7 and 8 for a terminal configured with localized allocation (terminal having relatively favorable reception quality) as DMRS antenna ports. By so doing, terminal 200 improves the coding gain, and can thereby improve reception characteristics as in the case of Embodiment 1.

On the other hand, based on the ePDCCH allocation method configured in terminal 200, terminal 200 identifies DMRS antenna ports in resources (RBs) allocated to ePDCCH intended for terminal 200 and also identifies resources to which ePDCCH is mapped. For example, in FIG. 15, when the ePDCCH allocation method intended for terminal 200 is distributed allocation, terminal 200 identifies antenna ports 7 and 9 as DMRS antenna ports. Likewise, in FIG. 15, when the ePDCCH allocation method intended for terminal 200 is localized allocation, terminal 200 identifies antenna ports 7 and 8 as DMRS antenna ports.

By so doing, it is possible to reduce the number of bits required to indicate association between each RB for ePDCCH and a combination of DMRS antenna ports compared to Embodiment 6. As in the case of Embodiment 6, indication of DMRS antenna port information from base station 100 to terminal 200 is unnecessary. As in the case of Embodiment 6, it is possible to speedily switch between DMRS antenna ports for terminal 200. Since the allocation method configured in terminal 200 is associated with a combination of DMRS antenna ports in a one-to-one correspondence, it is possible to avoid an increase in the number of times demodulation processing, and blind decoding are performed as in the case of Embodiment 6.

According to the present embodiment, it is possible to improve reception characteristics of terminal 200 in transmission diversity using two antenna ports in ePDCCH as in the case of Embodiment 1.

Embodiment 9

In Embodiment 7, it is necessary to indicate association between each CC for ePDCCH and a combination of DMRS antenna ports from base station 100 to terminal 200 beforehand. When indicating the above-described association, it is necessary to indicate for each CC, information (1 bit) indicating whether a combination of non-code-multiplexed DMRS antenna ports (e.g., antenna ports 7 and 9) is associated or a combination of code-multiplexed DMRS antenna ports (e.g., antenna ports 7 and 8) is associated. Thus, when N CCs can be allocated in ePDCCH, N bits are required to indicate the above-described association.

The present embodiment will describe a method for reducing the number of bits required to indicate association between each CC for ePDCCH and a combination of DMRS antenna ports as shown in Embodiment 7.

Since a base station and a terminal according to the present embodiment have basic configurations common to those of base station 100 and terminal 200 according to Embodiment 1, the configurations thereof will be described with reference to FIG. 4 and FIG. 5.

Figure 16:
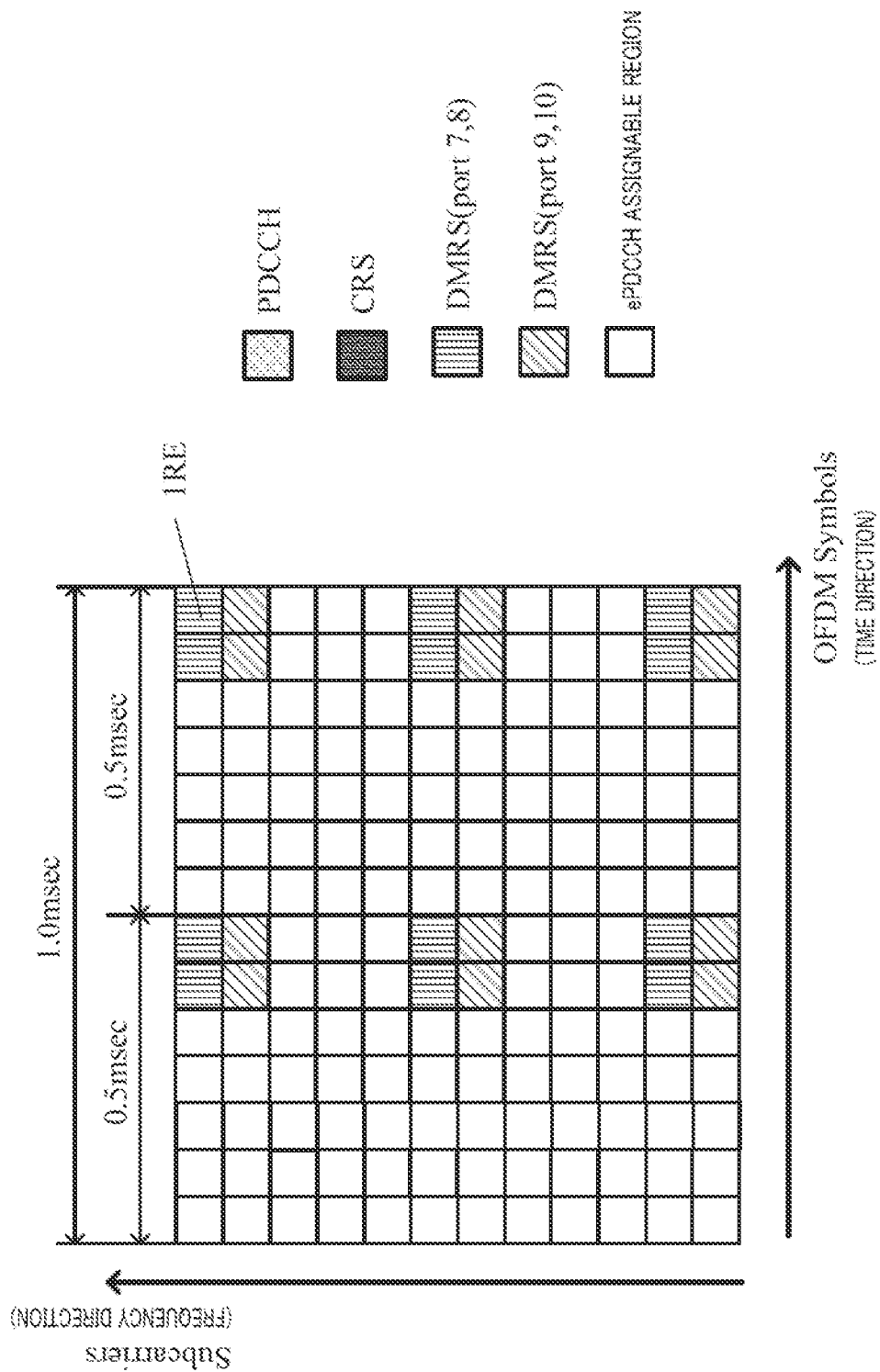
FIG. 16 is a diagram provided for describing PRB pairs in NCT CCs according to Embodiment 9 of the present invention.

Here, as a type of component carrier, studies are being carried out on a component carrier (New Carrier Type (NCT)) which does not transmit at least one of PDCCH and CRS for the purpose of efficient transmission of user data (see FIG. 16). As shown in FIG. 16, no PDCCH or CRS is transmitted with NCT CC, and it is thereby possible to increase the number of REs allocatable to ePDCCH per PRB compared to a conventional carrier (backward compatible carrier). Therefore, it is possible to improve channel estimation accuracy by using a combination of non-code-multiplexed antenna ports (e.g., pair of ports 7 and 9) as a combination of DMRS antenna ports in NCT.

Furthermore, NCT is estimated to be used at a high carrier frequency and its coverage is estimated to decrease due to radio wave characteristics. Thus, it is possible to use a combination of non-code-multiplexed antenna ports (e.g., pair of ports 7 and 9) as a combination of DMRS antenna ports in NCT to thereby apply power boosting and reduce the influence of the coverage reduction.

In the present embodiment, a combination of DMRS antenna ports configured in terminal 200 is associated with the type of CC (whether NCT or not) allocated for ePDCCH configured in terminal 200.

Figure 17:
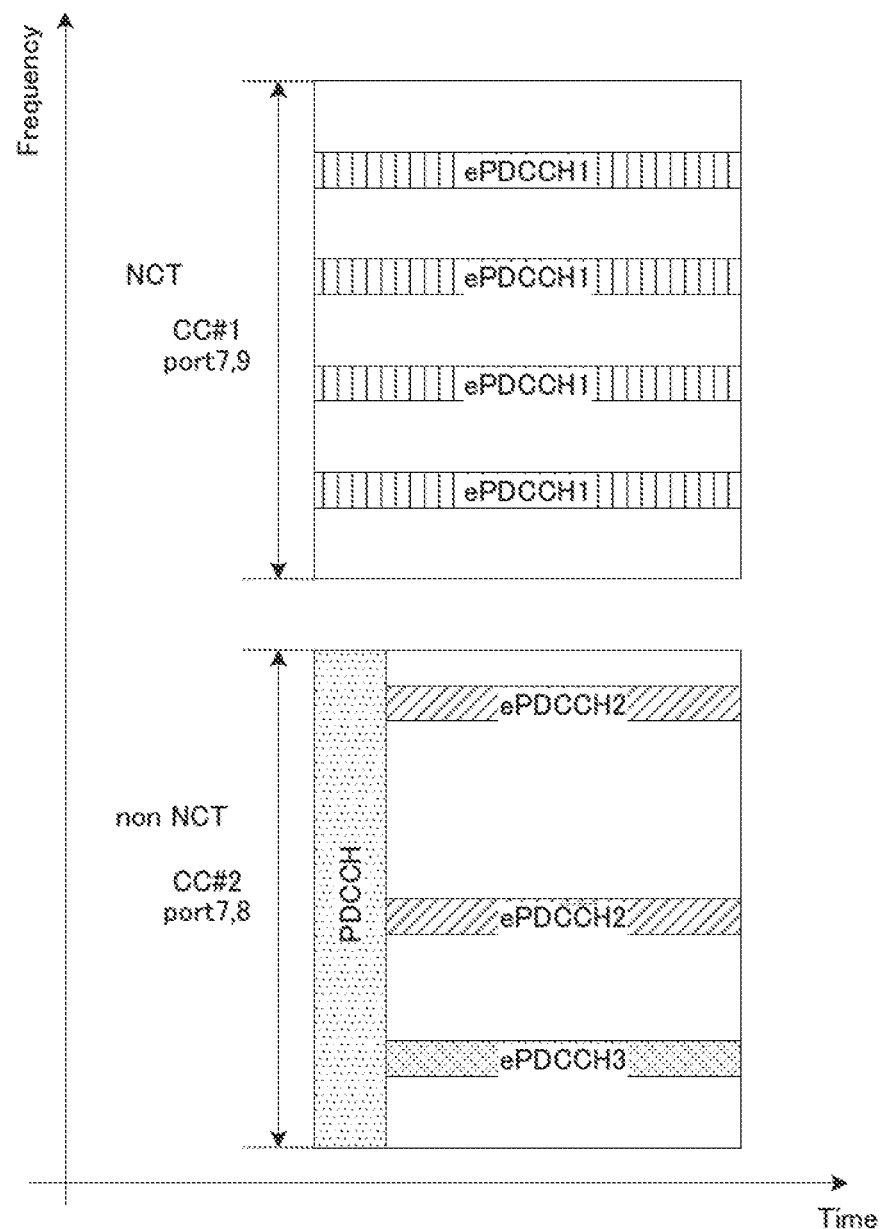
FIG. 17 illustrates examples of association between a type of CC to which ePDCCH is allocatable and an antenna port according to Embodiment 9 of the present invention.

FIG. 17 illustrates an example of association between a combination of DMRS antenna ports configured in terminal 200 and the type of CC (whether NCT or not) allocated for ePDCCH configured in terminal 200. In FIG. 17, a pair of code-multiplexed antenna ports 7 and 8, and a pair of non-code-multiplexed antenna ports 7 and 9 are used as combinations of DMRS antenna ports. In FIG. 17, NCT and non NCT are configured as the types of CC allocated to ePDCCH.

As shown in FIG. 17, non-code-multiplexed antenna ports 7 and 9 (ports 7 and 9) are associated with NCT CC (CC #1) and code-multiplexed antenna ports 7 and 8 (ports 7 and 8) are associated with non NCT CC (CC #2). In this case, information (1 bit) indicating whether a combination of non-code-multiplexed DMRS antenna ports (e.g., antenna ports 7 and 9) is associated or a combination of code-multiplexed DMRS antenna ports (e.g., antenna ports 7 and 8) is associated may be indicated for each type of CC (whether NCT or not) to which ePDCCH is allocatable. That is, bits necessary to indicate the above-described association from base station 100 to terminal 200 are not more than 2 bits regardless of the number of CCs for ePDCCH.

Base station 100 configures beforehand, association between a combination of DMRS antenna ports configured in terminal 200 and the type of CC to which ePDCCH configured in terminal 200 is allocatable. Base station 100 indicates terminal 200 of the above-described association via a higher layer beforehand. This allows base station 100 and terminal 200 to share the above-described association.

Base station 100 allocates a CC to be used for transmission of an ePDCCH signal intended for each terminal 200 based on reception quality of each terminal 200 as in the case of Embodiment 7. Base station 100 (configuration section 102) configures antenna ports associated with the type of CC to which ePDCCH configured in terminal 200 is allocatable as DMRS antenna ports.

In FIG. 17, base station 100 (configuration section 102) allocates NCT CC (CC #1) to a terminal having relatively poor reception quality and configures antenna ports 7 and 9 as DMRS antenna ports. By so doing, terminal 200 improves channel estimation accuracy, and can thereby improve reception characteristics as in the case of Embodiment 1. On the other hand, in FIG. 17, base station 100 (configuration section 102) allocates non NCT CC (CC #2) to a terminal having relatively favorable reception quality and configures antenna ports 7 and 8 as DMRS antenna ports. By so doing, terminal 200 can improve the coding gain and thereby improve reception characteristics as in the case of Embodiment 1.

On the other hand, terminal 200 identifies DMRS antenna ports in CC allocated to ePDCCH intended for terminal 200 based on the ePDCCH allocation method configured in terminal 200 and also identifies resources to which ePDCCH is mapped. For example, in FIG. 17, when CC allocated to ePDCCH intended for terminal 200 is CC #1, terminal 200 identifies antenna ports 7 and 9 as DMRS antenna ports. Similarly, in FIG. 17, when CC allocated to ePDCCH intended for terminal 200 is CC #2, terminal 200 identifies antenna ports 7 and 8 as DMRS antenna ports.

By so doing, it is possible to reduce the number of bits required to indicate association between the type of CC allocatable for ePDCCH and a combination of DMRS antenna ports compared to Embodiment 7. Indication of DMRS antenna port information from base station 100 to terminal 200 is unnecessary as in the case of Embodiment 7. It is also possible to speedily switch between DMRS antenna ports for terminal 200 as in the case of Embodiment 7. Since the allocation method configured in terminal 200 is associated with a combination of DMRS antenna ports in a one-to-one correspondence, it is possible to avoid an increase in the number of times demodulation processing, and blind decoding are performed as in the case of Embodiment 7.

According to the present embodiment, it is possible to improve the reception characteristics of terminal 200 when performing transmission diversity using two antenna ports in ePDCCH as in the case of Embodiment 1.

The embodiments of the present invention have been described so far.

OTHER EMBODIMENTS

[1] The description of the above-described embodiments has been limited to a case where the number of antenna ports for transmitting reference signals is 2, but the above-described embodiments can be likewise implemented in any case where two or more antenna ports are used. More specifically, when transmitting reference signals to terminal 200 using multiple antenna ports, base station 100 may configure one of a combination including antenna ports in which reference signals are not mutually code-multiplexed and a combination of all antenna ports in which reference signals are code-multiplexed as the multiple antenna ports based on reception quality of terminal 200 and transmit reference signals from the plurality of configured antenna ports. That is, when the number of antenna ports for transmitting reference signal is equal to or greater than 2, it is possible to obtain effects similar to those of the above-described embodiments by selecting whether to use multiple antenna ports in which all reference signals are code-multiplexed or multiple antenna ports including a combination in which reference signals are not code-multiplexed.

Figure 18:
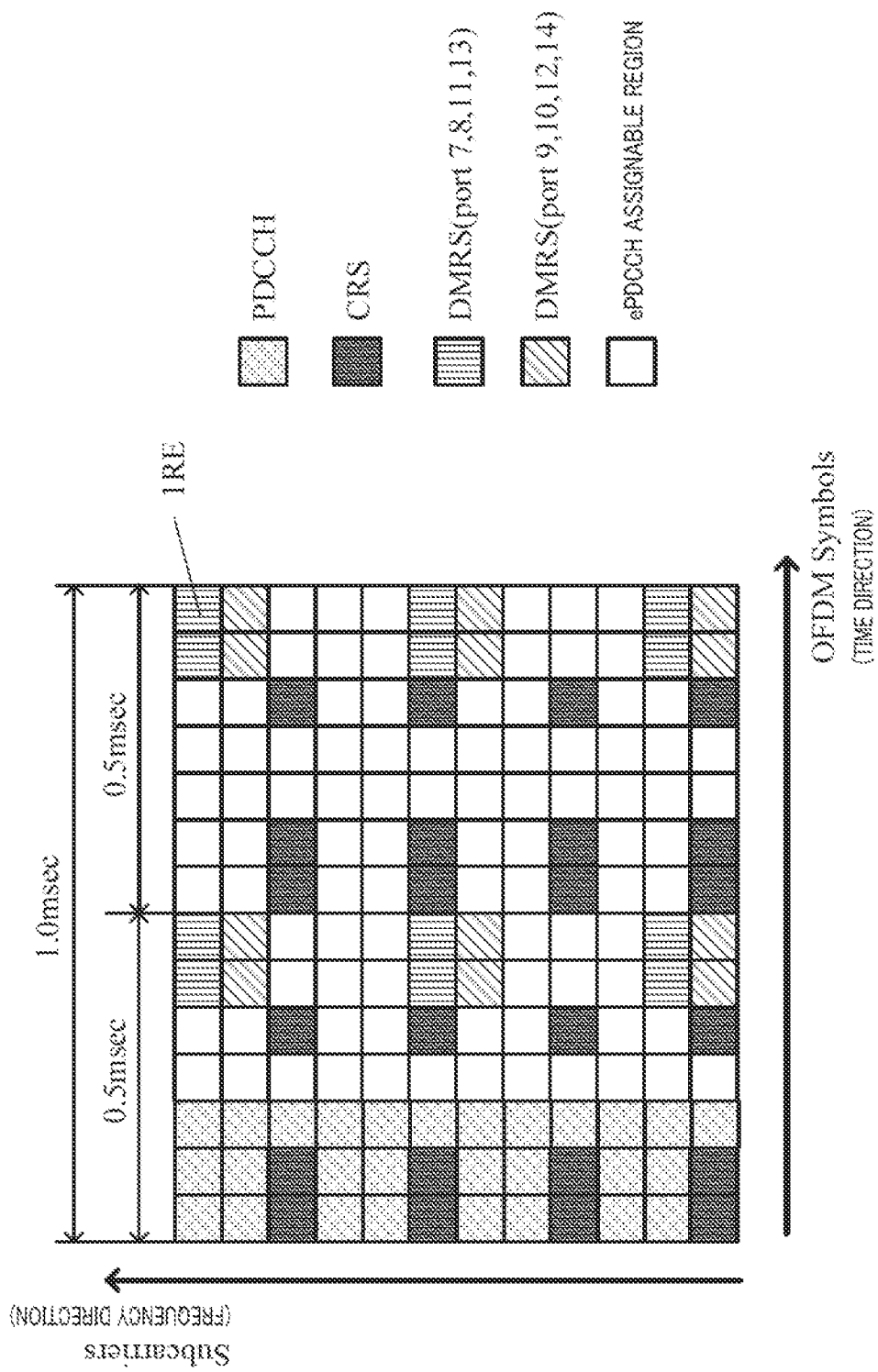
FIG. 18 is a diagram provided for describing PRB pairs according to another embodiment of the present invention.
Figures 19A, 19B:
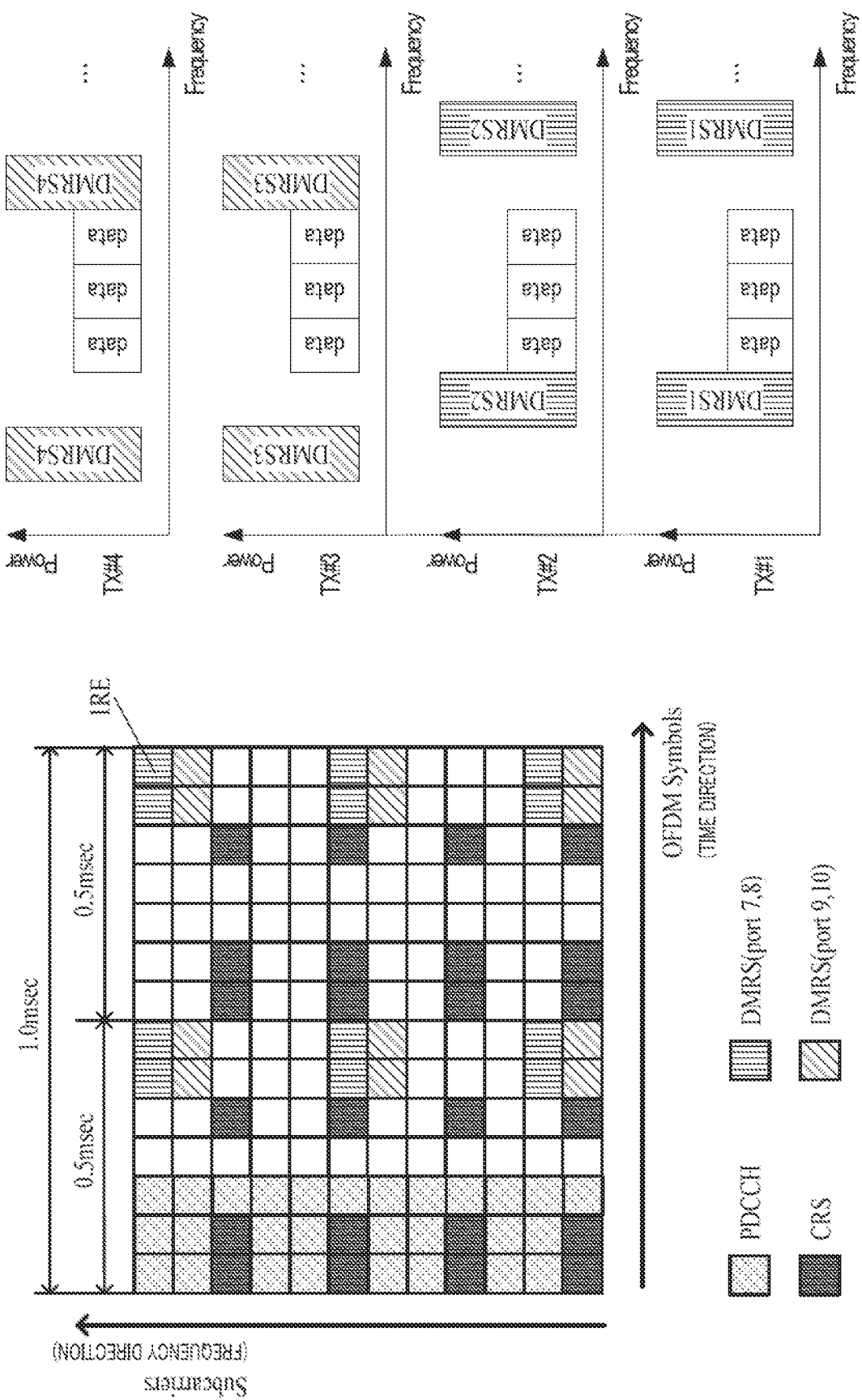
FIGS. 19A and 19B illustrates resource mapping and transmission power using non-code-multiplexed antenna ports according to still another embodiment of the present invention.
Figures 20A, 20B:
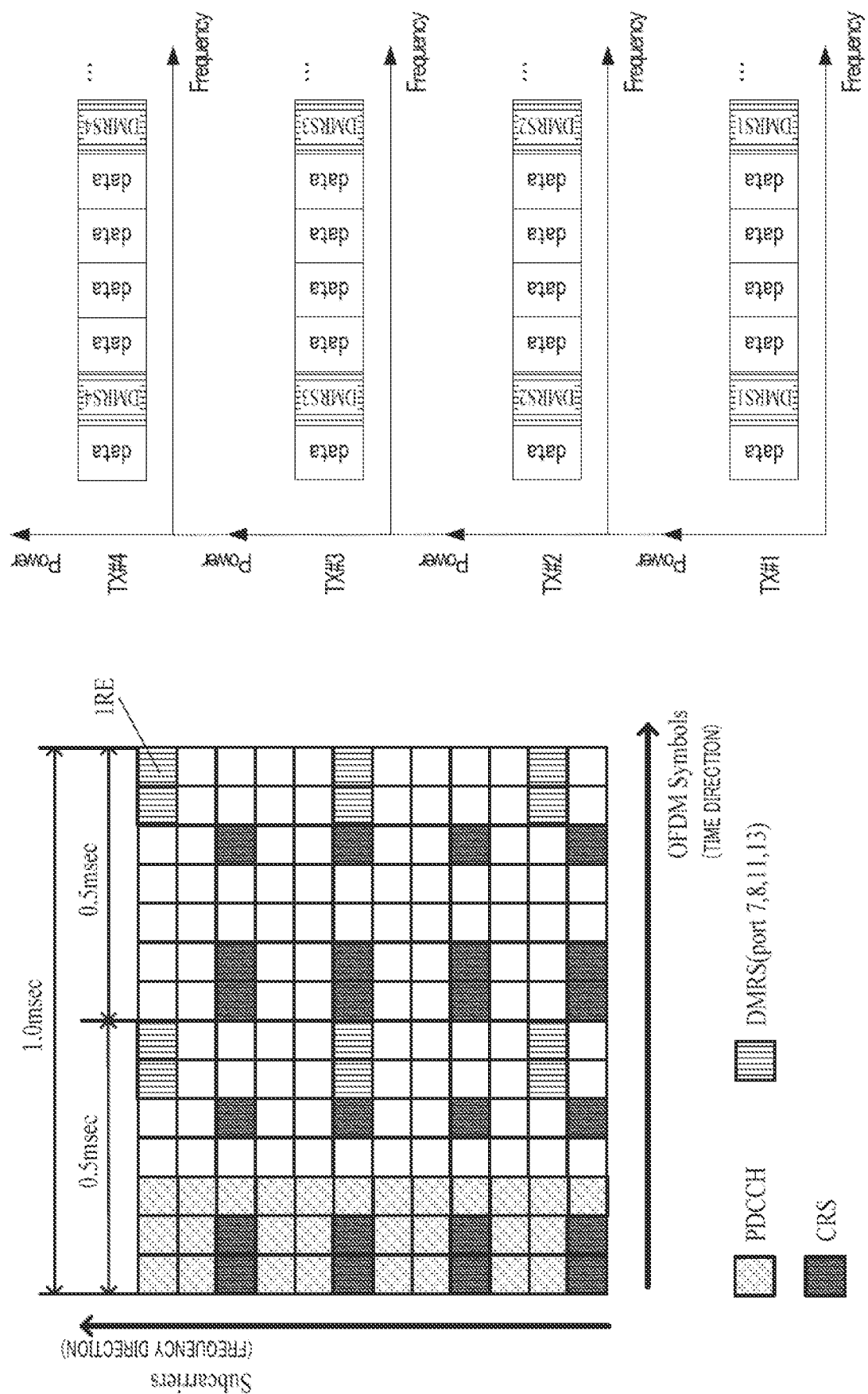
FIGS. 20A and 20B illustrates resource mapping and transmission power using code-multiplexed antenna ports according to yet another embodiment of the present invention.

For example, a case will be described where reference signals (DMRSs) are transmitted using 4 antenna ports. Up to 8 antenna ports are defined as DMRS antenna ports and as shown in FIG. 18, DMRSs (DMRSs (ports 7 and 8, 11, 13)) allocated to antenna ports 7 and 8, 11, 13 are mapped to the same RE through code-multiplexing. As shown in FIG. 18, DMRSs (DMRSs (ports 9, 10, 12 and 14)) allocated to antenna ports 9, 10, 12 and 14 are mapped to the same RE through code-multiplexing. Furthermore, DMRSs (ports 7, 8, 11 and 13) and DMRSs (ports 9, 10, 12 and 14) shown in FIG. 18 are mapped to different REs and not code-multiplexed. That is, as shown in FIG. 19A, by applying power boosting as shown in FIG. 19B to DMRSs allocated to a combination of non-code-multiplexed antenna ports, it is possible to improve channel estimation accuracy and thereby improve reception characteristics of terminal 200. As shown in FIG. 20A, although power boosting as shown in FIG. 20B is not applicable to DMRSs allocated to a combination of code-multiplexed antenna ports, the coding gain can be improved compared to FIG. 19A, and reception characteristics of terminal 200 can be thereby improved. Therefore, when transmitting reference signals (DMRSs) using 4 antenna ports, effects similar to those of the above-described embodiments can be obtained by selecting whether to use DMRSs (e.g., DMRSs (ports 7, 8, 9 and 10)) corresponding to a combination of non-code-multiplexed antenna ports as shown in FIG. 19A or a combination of antenna ports in which all DMRSs are code-multiplexed (e.g., DMRSs (ports 7, 8, 11 and 13)) as shown in FIG. 20A.

[2] A case has been described in the above-described embodiments where an aggregation level, CQI value, the number of CCEs per PRB pair used by terminal 200, type of subframe, ePDCCH allocation method or the like are used as configuration references for DMRS antenna ports. However, information used as the configuration references for DMRS antenna ports is not limited to these and any kind of information may be used if it represents reception quality of terminal 200.

[3] In each of the embodiments described above, the term "antenna port" refers to a logical antenna including one or more physical antennas. In other words, the term "antenna port" does not necessarily refer to a single physical antenna, and sometimes refers to an array antenna including a plurality of antennas, for example.

For example, in 3GPP LTE, how many physical antennas are included in the antenna port is not defined, but the antenna port is defined as the minimum unit allowing the base station to transmit a different reference signal.

In addition, an antenna port may be specified as a minimum unit to be multiplied by a precoding vector weighting.

[4]

In each embodiment described above, the present invention is configured with hardware by way of example, but the invention may also be provided by software in concert with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology, for example.

A transmission apparatus according to the present disclosure is a transmission apparatus that transmits reference signals to a reception apparatus using two antenna ports, the transmission apparatus including: a configuration section that configures one of a first antenna port pair and a second antenna port pair as the two antenna ports based on reception quality of the reception apparatus, the first antenna port pair being an antenna port pair in which the reference signals are not mutually code-multiplexed, the second antenna port pair being an antenna port pair in which the reference signals are code-multiplexed; and a transmission section that transmits the reference signals from the two configured antenna ports.

In the transmission apparatus according to the disclosure, the configuration section configures the first antenna port pair when an aggregation level configured in the reception apparatus is equal to or greater than a threshold and configures the second antenna port pair when the aggregation level is less than the threshold.

In the transmission apparatus according to the disclosure: the reception quality is more favorable when a higher CQI value is reported from the reception apparatus; and the configuration section configures the first antenna port pair when the CQI value is less than a threshold and configures the second antenna port pair when the CQI value is equal to or greater than the threshold.

In the transmission apparatus according to the disclosure, the configuration section configures the first antenna port pair when a number of control channel elements used for the reception apparatus among a plurality of control channel elements forming one physical channel resource block is equal to or greater than a threshold, and configures the second antenna port pair when the number of the control channel elements is less than the threshold.

In the transmission apparatus according to the disclosure, the configuration section configures the first antenna port pair when a second subframe is configured in the reception apparatus and configures the second antenna port pair when a first subframe is configured in the reception apparatus, the second subframe being a subframe for which transmission power of a signal from the transmission apparatus is configured to be lower than that for the first subframe.

In the transmission apparatus according to the disclosure: one of the first antenna port pair and the second antenna port pair is associated with each of a plurality of resources allocatable to the reception apparatus; and the configuration section configures one of the first antenna port pair and the second antenna port pair as the two antenna ports, the one of the first and the second antenna port pairs being associated with a resource allocated based on reception quality of the reception apparatus.

In the transmission apparatus according to the disclosure: the first antenna port pair or the second antenna port pair is associated with each of a plurality of component carriers allocatable to the reception apparatus; and the configuration section configures one of the first antenna port pair and the second antenna port pair as the two antenna ports, the one of the first and the second antenna ports being associated with a component carrier allocated based on the reception quality of the reception apparatus.

In the transmission apparatus according to the disclosure, the first antenna port pair is associated with a component carrier that does not transmit at least one of PDCCH (physical downlink control channel) and CRS (cell-specific reference signal) among the plurality of component carriers allocatable to the reception apparatus, and the second antenna port pair is associated with a component carrier that transmits the PDCCH and the CRS among the plurality of component carriers.

In the transmission apparatus according to the disclosure, the configuration section configures the first antenna port pair when the reception apparatus is configured with a first allocation method that allocates signals in a distributed manner in a frequency domain and configures the second antenna port pair when the reception apparatus is configured with a second allocation method that allocates signals in a localized manner in a frequency domain.

In the transmission apparatus according to the disclosure, when configuring the reception apparatus with the second antenna port pair, the configuration section configures an antenna port other than antenna ports included in the two antenna ports pairs, as an antenna port to be used for transmission of a signal intended for a reception apparatus configured with a transmission method using a single-antenna port.

A reception apparatus according to the disclosure includes: a reception section that receives reference signals transmitted using two antenna ports among a plurality of antenna ports included in a transmission apparatus; and a control signal processing section that identifies one of a first antenna port pair and a second antenna port pair as the two antenna ports based on reception quality of the reception apparatus and that demodulates a control signal using reference signals in the identified two antenna ports, the first antenna port pair being an antenna port pair in which the reference signals are not mutually code-multiplexed, the second antenna port pair being an antenna port pair in which the reference signals are code-multiplexed.

A transmission method according to the disclosure is a transmission method for transmitting reference signals to a reception apparatus using two antenna ports, the transmission method including: configuring one of a first antenna port pair and a second antenna port pair as the two antenna ports based on reception quality of the reception apparatus, the first antenna port pair being an antenna port pair in which the reference signals are not mutually code-multiplexed, the second antenna port pair being an antenna port pair in which the reference signals are code-multiplexed; and transmitting the reference signals from the two configured antenna ports.

A reception method according to the disclosure includes: receiving reference signals transmitted using two antenna ports among a plurality of antenna ports included in a transmission apparatus; and identifying one of a first antenna port pair and a second antenna port pair as the two antenna ports based on reception quality of the reception apparatus and demodulating a control signal using reference signals in the identified two antenna ports, the first antenna port pair being an antenna port pair in which the reference signals are not mutually code-multiplexed, the second antenna port pair being an antenna port pair in which the reference signals are code-multiplexed.

The disclosures of the specifications, drawings, and abstracts included in Japanese Patent Application No. 2012-061974 filed on Mar. 19, 2012, and Japanese Patent Application No. 2012-109499 filed on May 11, 2012 are incorporated herein by reference in their entireties.

INDUSTRIAL APPLICABILITY

The present invention is useful in mobile communication systems.

REFERENCE SIGNS LIST

100 Base station
200 Terminal
101 Assignment information generation section
102 Configuration section
103 DMRS generation section
104, 206 Error correction coding section
105 Mapping section
106, 207 Modulation section
107 Precoding section
108, 208 Signal assignment section
109, 209 Transmission section
110, 201 Reception section
111, 203 Demodulation section
112, 204 Error correction decoding section
202 Signal separating section
205 Control signal processing section

The invention claimed is:

1. A base station, comprising:
circuitry, which, in operation, determines one or more antenna ports used for transmission of reference signals; and
a transmitter, which, in operation, transmits downlink control information including Demodulation Reference Signal (DMRS) antenna port information indicating the one or more antenna ports,
wherein the one or more antenna ports are selected from a plurality of candidates including a first antenna port pair, a second antenna port pair, and a single antenna port,
wherein the first antenna port pair is an antenna port pair in which reference signals of a first antenna port and a second antenna port are assigned in different resource elements and power boosting is applied to the reference signals, the second antenna port pair is an antenna port pair in which the reference signals of the first antenna port and a third antenna port are assigned in same resource elements and power boosting is not applied to the reference signals, and the single antenna port is the second antenna port.

2. The base station according to claim 1, wherein the reference signals are transmitted from the base station.

3. The base station according to claim 1, wherein the one or more antenna ports used for the transmission of reference signals are different among component carriers.

4. The base station according to claim 1, wherein the one or more antenna ports are selected from at most four antenna ports.

5. The base station according to claim 1, wherein the reference signals are demodulation reference signals (DMRSs).

6. A communication method performed by a base station, the method comprising:
determining one or more antenna ports used for transmission of reference signals; and
transmitting downlink control information including Demodulation Reference Signal (DMRS) antenna port information indicating the one or more antenna ports,
wherein the one or more antenna ports are selected from a plurality of candidates including a first antenna port pair, a second antenna port pair, and a single antenna port,
wherein the first antenna port pair is an antenna port pair in which the reference signals of a first antenna port and a second antenna port are assigned in different resource elements and power boosting is applied to the reference signals, the second antenna port pair is an antenna port pair in which the reference signals of the first antenna port and a third antenna port are assigned in same resource elements and power boosting is not applied to the reference signals, and the single antenna port is the second antenna port.

7. The communication method to claim 6, wherein the reference signals are transmitted from the base station.

8. The communication method according to claim 6, wherein the one or more antenna ports used for the transmission of reference signals are different among component carriers.

9. The communication method according to claim 6, wherein the one or more antenna ports are selected from at most four antenna ports.

10. The communication method according to claim 6, wherein the reference signals are demodulation reference signals (DMRSs).

* * * * *